United States Patent
Ito et al.

(10) Patent No.: US 10,648,684 B2
(45) Date of Patent: May 12, 2020

(54) AIR-CONDITIONING APPARATUS AND AIR-CONDITIONING CONTROL METHOD

(71) Applicant: MITSUBISHI ELECTRIC CORPORATION, Tokyo (JP)

(72) Inventors: Shinichi Ito, Tokyo (JP); Fumitake Unezaki, Tokyo (JP); Mamoru Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 798 days.

(21) Appl. No.: 14/415,776

(22) PCT Filed: Jul. 12, 2013

(86) PCT No.: PCT/JP2013/069114
§ 371 (c)(1),
(2) Date: Jan. 20, 2015

(87) PCT Pub. No.: WO2014/017316
PCT Pub. Date: Jan. 30, 2014

(65) Prior Publication Data
US 2015/0219356 A1 Aug. 6, 2015

(30) Foreign Application Priority Data

Jul. 23, 2012 (JP) ................................ 2012-162600

(51) Int. Cl.
*F24F 11/00* (2018.01)
*F24F 11/30* (2018.01)
(Continued)

(52) U.S. Cl.
CPC .......... *F24F 11/30* (2018.01); *G05D 23/1904* (2013.01); *F24F 11/46* (2018.01);
(Continued)

(58) Field of Classification Search
CPC ...... F24F 11/02; F24F 2011/013; F24F 11/08; F24F 11/0034; F24F 11/0012;
(Continued)

(56) References Cited

U.S. PATENT DOCUMENTS 4,172,555 A * 10/1979 Levine ...................... F23N 5/20
                                                          236/15 BG
4,407,447 A * 10/1983 Sayegh ................. F24F 11/0034
                                                              165/205
(Continued)

FOREIGN PATENT DOCUMENTS

CN        203478500 U    3/2014
JP        63-029135 A    2/1988
(Continued)

OTHER PUBLICATIONS

Office Action dated Aug. 29, 2017 issued in corresponding JP patent application No. 2014-526850 (and English translation).
(Continued)

*Primary Examiner* — Travis C Ruby
*Assistant Examiner* — Harry E Arant
(74) *Attorney, Agent, or Firm* — Posz Law Group, PLC

(57) ABSTRACT

On the basis of a detection result obtained by a pre-presence-in-room environment detection means, an air-conditioning apparatus A changes a presence-in-room start set temperature Ts serving as a target temperature at the start time of a precooling operation or a preheating operation and at the presence-in-room start scheduled time of the user.

12 Claims, 14 Drawing Sheets

(51) Int. Cl.
  *G05D 23/19* (2006.01)
  *F24F 120/10* (2018.01)
  *F24F 11/46* (2018.01)
  *F24F 11/56* (2018.01)
  *F24F 11/61* (2018.01)

(52) U.S. Cl.
  CPC ............... *F24F 11/56* (2018.01); *F24F 11/61* (2018.01); *F24F 2120/10* (2018.01)

(58) Field of Classification Search
  CPC ............ F24F 11/076; F24F 2011/0035; F24F 2120/00; F24F 2120/10; F24F 2120/12; F24F 2120/14; F24F 11/00
  See application file for complete search history.

(56) References Cited

U.S. PATENT DOCUMENTS

| | | | | |
|---|---|---|---|---|
| 5,009,076 A | * | 4/1991 | Winslow | ............... F25B 49/005 62/129 |
| 2005/0005621 A1 | * | 1/2005 | Jayadev | ............. G05D 23/1923 62/230 |
| 2010/0036533 A1 | * | 2/2010 | Masuda | ............... F24F 11/0034 700/278 |
| 2010/0235004 A1 | * | 9/2010 | Thind | .................... G05B 15/02 700/277 |
| 2013/0218349 A1 | * | 8/2013 | Coogan | .................. G05B 13/02 700/275 |
| 2015/0219356 A1 | | 8/2015 | Ito et al. | |

FOREIGN PATENT DOCUMENTS

| | | | |
|---|---|---|---|
| JP | 02-254246 A | | 10/1990 |
| JP | 02254246 A | * | 10/1990 |
| JP | 03-207947 A | | 9/1991 |
| JP | 09-229449 A | | 9/1997 |
| JP | 2002-251201 A | | 9/2002 |
| JP | 2005-106355 A | | 4/2005 |

OTHER PUBLICATIONS

Office Action dated Aug. 2, 2016 issued in corresponding CN patent application No. 201380038901.3 (and English translation).
International Search Report of the International Searching Authority dated Aug. 20, 2013 for the corresponding international application No. PCT/JP2013/069114 (and English translation).
Office Action dated May 31, 2016 for the corresponding JP patent application No. 2014-526850 (and English translation).
Office Action dated Dec. 19, 2017 issued in corresponding JP patent application No. 2014-526850 (and English translation).

* cited by examiner

US 10,648,684 B2

AIR-CONDITIONING APPARATUS AND AIR-CONDITIONING CONTROL METHOD

CROSS REFERENCE TO RELATED APPLICATIONS

This application is a U.S. national stage application of International Application No. PCT/JP2013/069114 filed on Jul. 12, 2013, and is based on Japanese Patent Application No. 2012-162600 filed on Jul. 23, 2012, the disclosures of which are incorporated by reference.

TECHNICAL FIELD

The present invention relates to an air-conditioning apparatus and an air-conditioning apparatus control method which execute a precooling operation or a preheating operation so that a temperature in an air-conditioned space reaches a target temperature before the presence of a user in the room.

BACKGROUND ART

An air-conditioning apparatus which executes a precooling operation or a preheating operation so that the indoor temperature reaches a target temperature at a designated time (a time set by the user) has conventionally been available. Regarding such an air-conditioning apparatus, an air-conditioning apparatus operation control method has been proposed in which a heat leakage coefficient and a temperature decrease coefficient are calculated in consideration of the condition in which the indoor temperature before a preheating operation has decreased, the amount of power consumption for setting the indoor temperature to a target temperature at a designated time is calculated and estimated on the basis of these coefficients, and operation is performed so that an air-conditioning apparatus is started when the amount of power consumption minimizes (see, for example, Patent Literature 1).

CITATION LIST

Patent Literature

Patent Literature 1: Japanese Unexamined Patent Application Publication No. 63-29135 (claim 1, pages 2 to 4)

SUMMARY OF INVENTION

Technical Problem

In the air-conditioning apparatus as described above in Patent Literature 1, operation control is performed so that the indoor temperature reaches the target temperature at the start of the presence in the room. However, in, for example, a cooling period in which the outdoor air has a high temperature (e.g., 35 degrees C.) and the set temperature is low (e.g., 25 degrees C.), when the user enters an air-conditioned space from the outside, the difference between the indoor temperature and the outdoor temperature is great, and the user comfort in the room is apparently high, but a relatively heavy burden is imposed on the body of the user is increased due to factors associated with the temperature difference.

Even in a situation in which, for example, the user moves from one room to another room (e.g., from a bedroom to a living room), since the amount of activity of the user is different for each room, the set temperature may be different for each room. Assume, for example, that the target temperature is set high (e.g., 28 degrees C.) at bedtime and is set low (e.g., 26 degrees C.) in the living room after a wake-up time. In this case, it cannot be determined whether the target temperature at the start of the presence in the room is to be set for bedtime (28 degrees C.) or for wake-up time (26 degrees C.) in executing a precooling operation in the living room.

When power saving is prioritized, it is possible to increase the efficiency of an apparatus and reduce integrated power consumption by performing a precooling operation or a preheating operation with a low capacity. However, when the indoor temperature is allowed to reach a target temperature at the start of the presence in the room, the efficiency of a precooling operation or a preheating operation is decreased upon an increase in capacity, or the time taken for a precooling operation or a preheating operation is prolonged, whereby loss of heat release to the outside of a house is increased. Thus, when power saving is prioritized, it is often the case that power saving is achieved more reliably when neither a precooling operation nor a preheating operation is executed.

The present invention has been made in order to solve at least one of the above-described problems, and has as its first object to provide an air-conditioning apparatus and an air-conditioning control method which can reduce the burden imposed on the human body.

It is the second object of the present invention to provide an air-conditioning apparatus and an air-conditioning control method which achieve both power saving with increased apparatus efficiency and user comfort.

Solution to Problem

The present invention in an aspect provides an air-conditioning apparatus which executes a precooling operation or a preheating operation so that a temperature in an air-conditioned space reaches a target temperature before presence of a user in a room. The air-conditioning apparatus includes: pre-presence-in-room environment detection means for detecting whether an environment in which the user stays before the presence in the room is indoor or outdoor; and a controller configured to execute the precooling operation or the preheating operation on the basis of a detection result obtained by the pre-presence-in-room environment detection means. The controller includes a presence-in-room start temperature control unit configured to change, on the basis of the detection result obtained by the pre-presence-in-room environment detection means, a presence-in-room start set temperature serving as a target temperature at a start time of the precooling operation or the preheating operation and a presence-in-room start scheduled time of the user.

The present invention in another aspect provides an air-conditioning control method for an air-conditioning apparatus which detects whether an environment in which a user stays before presence in a room is indoor or outdoor, and executes, on the basis of a detection result obtained by the air-conditioning apparatus, a precooling operation or a preheating operation so that a temperature in an air-conditioned space reaches a target temperature before the presence of the user in the room. The method includes: if a presence-in-room start set temperature serving as a target temperature at a presence-in-room start scheduled time of the user, and a target temperature after start of the presence of the user in the room are different from each other, setting the presence-in-room start set temperature to not less than the target temperature after the start of the presence of the user in the room in the precooling operation, and setting the presence-in-room start set temperature to not more than the target temperature after the start of the presence of the user in the room in the preheating operation; and if it is determined that the environment before the presence of the user in the room is outdoor, comparing an outdoor temperature detected before the presence in the room with a preset upper limit temperature, setting a new presence-in-room start set temperature to a value obtained by subtracting a predetermined temperature width from the presence-in-room start set temperature if the outdoor temperature is lower than the upper limit temperature, and setting the new presence-in-room start set temperature to the upper limit temperature as a guaranteed temperature if the outdoor temperature is not lower than the upper limit temperature, and if it is determined that the environment before the presence of the user in the room is indoor, comparing an indoor temperature detected before the presence in the room with a preset target set temperature, setting the presence-in-room start set temperature to the target set temperature if an absolute value of a difference between the indoor temperature and the target set temperature is smaller than a predetermined determination threshold, and setting the presence-in-room start set temperature as a guaranteed temperature if the absolute value of the difference between the indoor temperature and the target set temperature is not smaller than the determination threshold.

Advantageous Effects of Invention

With the air-conditioning apparatus and the air-conditioning control method according to the present invention, information before the presence of the user in the room, and the state of the air-conditioned space in which the user is scheduled to be present are obtained, and operation control during absence is determined based on these pieces of information. Thus, it is possible to simultaneously achieve both a reduction in burden imposed on the human body due to factors associated with the temperature difference, guarantee of comfort, and power saving with increased apparatus efficiency.

DESCRIPTION OF EMBODIMENTS

Figure 1:
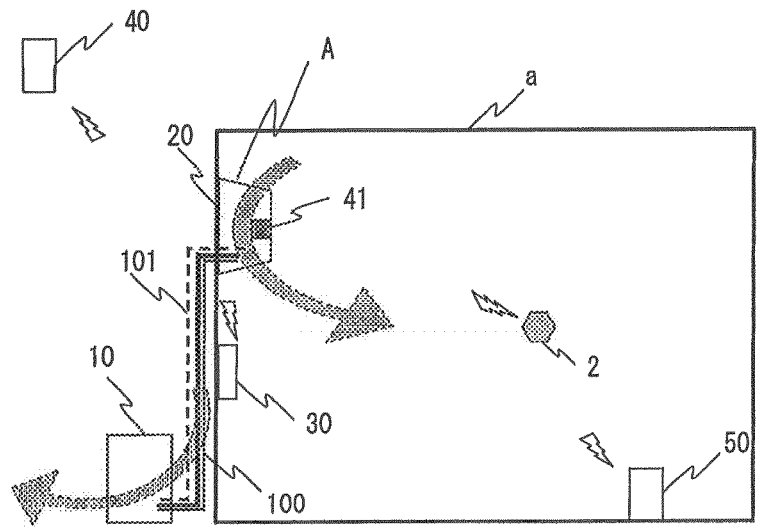
FIG. 1 is a system configuration diagram schematically showing an exemplary system configuration of an air-conditioning apparatus according to an embodiment of the present invention.

An embodiment of the present invention will be described hereinafter with reference to the accompanying drawings. Note that the relationship of size of each constituent member in the following drawings including FIG. 1 may be different from an actual size. In addition, in the following drawings including FIG. 1, the same reference numerals or symbols denote the same or equivalent components, and this applies to the entire specification. Furthermore, the forms of the components to be described throughout the entire specification are merely illustrative examples, and should not be limited to these examples.

«System Configuration»

FIG. 1 is a system configuration diagram schematically showing an exemplary system configuration of an air-conditioning apparatus A according to the embodiment of the present invention. The system configuration of the air-conditioning apparatus A, specifically, the arrangement of each device constituting the air-conditioning apparatus A will be described with reference to FIG. 1.

The air-conditioning apparatus A includes a heat source unit (outdoor unit) 10 and an indoor unit 20, and cools or heats an air-conditioned space a by means of cold air or hot air blown out from the indoor unit 20. The indoor unit 20 is installed at a position where conditioned air can be supplied into the air-conditioned space a (e.g., a wall surface defining the air-conditioned space a, or the upper surface of the ceiling). In addition, the air-conditioning apparatus A is equipped with a vapor compression refrigeration cycle, and the heat source unit 10 and the indoor unit 20 are connected to each other via a pipe 100 through which a refrigerant flows, and a communication line 101 used for communication. Moreover, as shown in FIG. 1, the air-conditioning apparatus A includes a controller 30 such as a remote controller which accepts an instruction from the user (including, for example, a resident, or a person staying in the room). The indoor unit 20 and the controller 30 are connected to each other by wired or wireless connection.

FIG. 1 shows a state in which the controller 30 and the indoor unit 20 wirelessly communicate with each other. In addition, referring to FIG. 1, only one heat source unit 10 and only one indoor unit 20 are connected to each other, but the numbers of heat source units 10 and indoor units 20 are not particularly limited and can be changed in accordance with the outdoor unit capacity or the required air-conditioning capacity. Referring to FIG. 1, only one indoor unit 20 and only one controller 30 are connected to each other as well, but the numbers of indoor units 20 and controllers 30 are not particularly limited and can be changed in accordance with the number of indoor units.

The air-conditioning apparatus A includes an external information obtaining means 40. The external information obtaining means 40 obtains external information (e.g., a weather forecast or an air temperature variation). A temperature sensor or the like can be used as the external information obtaining means 40. The external information obtaining means 40 may be spaced apart from the heat source unit 10, as shown in FIG. 1, or installed in the heat source unit 10. When the external information obtaining means 40 is spaced apart from the heat source unit 10, external information measured by the external information obtaining means 40 is preferably received by a receiving unit 41, provided in the indoor unit 20, via the Internet or the like. When the external information obtaining means 40 is installed in the heat source unit 10, external information measured by the external information obtaining means 40 is preferably transmittable to the indoor unit 20 via the communication line 101.

Note that external information received by the receiving unit 41 or external information transmitted via the communication line 101 is preferably transmittable to the controller 30. In addition, a position where the external information obtaining means 40 is arranged is not limited to that shown in FIG. 1, and the external information obtaining means 40 may fall either within or outside the air-conditioned space a. The external information obtaining means 40 is one of the "pre-presence-in-room environment detection means" of the present invention.

The air-conditioning apparatus A includes a presence-in-room information obtaining means 50. The presence-in-room information obtaining means 50 is installed in the air-conditioned space a, as shown in FIG. 1, and obtains presence-in-room information. The presence-in-room information obtained by the presence-in-room information obtaining means 50 is, for example, at least one of presencein-room information which is set in advance by the user (e.g., the time when the user starts to be present in the room, the duration in which the user keeps present in the room, or the time when the user becomes absent), use information of a device present in the air-conditioned space a (e.g., a device such as an air-conditioning apparatus or an illumination device), human detection information obtained by a human sensor or the like that uses infrared rays or the like, open/close information of an interior door, and the like. The presence-in-room information obtained by the presence-in-room information obtaining means 50 is sent to the air-conditioning apparatus A and set as the life pattern of the user.

For example, when the average operating time of the air-conditioning apparatus A during a predetermined period or the operating time of the air-conditioning apparatus A on the previous day is AM8:00 to PM10:00, this information is desirably obtained by the presence-in-room information obtaining means 50, and the air-conditioning apparatus A desirably sets 14 hours as a presence-in-room time which is one of life patterns of the user. The presence-in-room information obtaining means 50 is one of the "pre-presence-in-room environment detection means" of the present invention.

Note that the external information obtaining means 40 and the presence-in-room information obtaining means 50 need only be able to obtain and transmit information by wired or wireless communication. Hence, the external information obtaining mean 40 and the presence-in-room information obtaining means 50 may be implemented using a single device (e.g., a laptop computer, or a mobile phone with an internet communication function), or the controller 30 may have the same function. In addition, the number of devices constituting the external information obtaining means 40 and the presence-in-room information obtaining means 50 is not particularly limited.

The air-conditioning apparatus A includes a load detection means 2. The load detection means 2 is installed in the air-conditioned space a, as shown in FIG. 1, and obtains information on the air-conditioned space a. A temperature sensor, an infrared temperature sensor, or the like can be used as the load detection means 2. The load detection means 2 is one of the "pre-presence-in-room environment detection means" of the present invention.

Note that information transmitted from the external information obtaining means 40 may be used instead of disposing the load detection means 2. For example, the controller 30 may obtain external information via the receiving unit 41 from the external information obtaining means 40 that has obtained a daily temperature, an amount of solar radiation, forecast variation information of the wind direction and speed of outdoor air, and the like, from an external weather information forecast system via the Internet, and calculate room temperature during a precooling operation or a preheating operation by using the thermal insulation performance of a framework of a house which can be input in advance. Thus, the position of the load detection means 2 is not necessarily limited to that shown in FIG. 1.

«Refrigerant Circuit Configuration»

Figure 2:
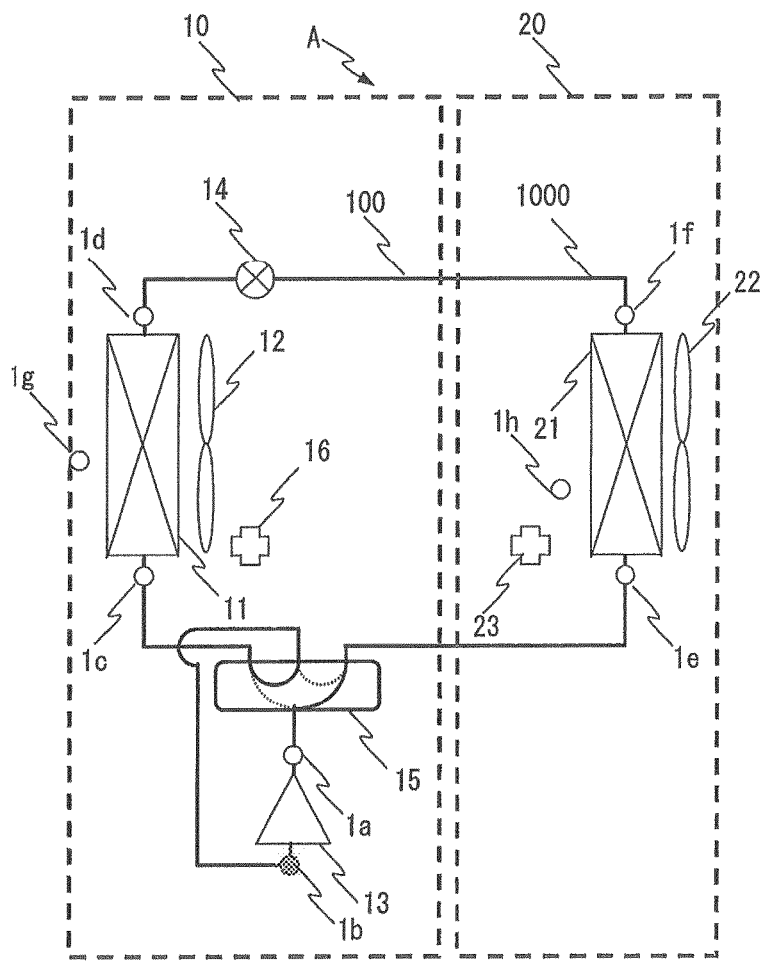
FIG. 2 is a refrigerant circuit diagram schematically showing an exemplary refrigerant circuit configuration of the air-conditioning apparatus according to the embodiment of the present invention.

FIG. 2 is a refrigerant circuit diagram schematically showing an exemplary refrigerant circuit configuration of the air-conditioning apparatus A. The refrigerant circuit configuration of the air-conditioning apparatus A will be described with reference to FIG. 2. As shown in FIG. 1, the air-conditioning apparatus A has a configuration in which the heat source unit 10 and the indoor unit 20 are connected to each other via the pipe 100.

The heat source unit 10 is equipped with a compressor 13 which compresses the refrigerant, a heat exchanger (heat source side heat exchanger) 11 serving as a condenser which condenses the refrigerant or an evaporator which evaporates the refrigerant, an air-sending means 12 which blows air toward the heat exchanger 11, an expansion means 14 which reduces the pressure of the condensed refrigerant, and a four-way valve 15 which inverts the directions in which the refrigerant flows through the heat exchangers 11 and 21.

The indoor unit 20 is equipped with a heat exchanger (load side heat exchanger) 21 serving as a condenser which condenses the refrigerant or an evaporator which evaporates the refrigerant, and an air-sending means 22 which blows air toward the heat exchanger 21.

The compressor 13, the four-way valve 15, the heat exchanger 11, the expansion means 14, and the heat exchanger 21 are connected to each other via the pipe 100 to form a refrigerant circuit. More specifically, a refrigeration cycle 1000 is formed by a refrigerant circuit which circulates the refrigerant through the compressor 13, the four-way valve 15, the heat exchanger 11, the expansion means 14, and the heat exchanger 21 in this order and returns it to the compressor 13; or a refrigerant circuit which circulates the refrigerant through the compressor 13, the four-way valve 15, the heat exchanger 21, the expansion means 14, and the heat exchanger 11 in this order and returns it to the compressor 13.

(Compressor 13) The compressor 13 may be implemented in a positive displacement compressor which is driven by a motor (not shown) controlled by an inverter and is capable of varying its operation capacity. FIG. 2 illustrates an exemplary case where only one compressor 13 is used, but the number of compressors 13 is not particularly limited, and two or more compressors 13 may be connected in parallel or in series and provided in the heat source unit 10.

(Heat Exchanger 11)

The heat exchanger 11 exchanges heat between the outdoor air and the refrigerant circulating through the refrigeration cycle 1000. As described above, outdoor air is supplied to the heat exchanger 11 by the air-sending means 12. The heat exchanger 11 can be implemented in, for example, a cross-fin fin-and-tube heat exchanger including a heat-transfer pipe and a large number of fins. Alternatively, the heat exchanger 11 can be implemented in a micro-channel heat exchanger, a shell-and-tube heat exchanger, a heat pipe heat exchanger, or a double tube heat exchanger.

(Heat Exchanger 21)

The heat exchanger 21 exchanges heat between the indoor air and the refrigerant circulating through the refrigeration cycle 1000. As described above, indoor air is supplied to the heat exchanger 21 by the air-sending means 22. Similarly to the heat exchanger 11, the heat exchanger 21 is preferably implemented in, for example, a fin-and-tube heat exchanger, a micro-channel heat exchanger, a shell-and-tube heat exchanger, a heat pipe heat exchanger, or a double tube heat exchanger.

(Air-Sending Means 12)

The air-sending means 12 is implemented in a fan which supplies air to the heat exchanger 11 at a variable flow rate, and is preferably implemented in a centrifugal fan, a multi-blade fan, or the like driven by a motor such as a DC fan motor.

(Air-Sending Means 22)

The air-sending means 22 is implemented in a fan which supplies air to the heat exchanger 21 at a variable flow rate, and is preferably implemented in a centrifugal fan, a multi-blade fan, or the like driven by a motor such as a DC fan motor.

(Expansion Means 14)

The expansion means 14 is preferably capable of, for example, adjusting the flow rate of the refrigerant flowing through the refrigerant circuit, and is preferably implemented using, for example, an electronic expansion valve whose opening degree can be controlled by a stepping motor (not shown), a mechanical expansion valve which uses a diaphragm in its pressure receiving portion, a capillary tube, or the like.

(Four-Way Valve 15)

The four-way valve 15 switches the directions in which the refrigerant flows through the heat exchangers 11 and 21. In cooling the air-conditioned space a, the four-way valve 15 is switched so that the refrigerant flows through the compressor 13, the four-way valve 15, the heat exchanger 11, the expansion means 14, and the heat exchanger 21 in this order.

On the other hand, in heating the air-conditioned space a, the four-way valve 15 is switched so that the refrigerant flows through the compressor 13, the four-way valve 15, the heat exchanger 21, the expansion means 14, and the heat exchanger 11 in this order.

(Refrigerant)

Examples of the refrigerant used in the air-conditioning apparatus A include a zeotropic refrigerant mixture, a near-azeotropic refrigerant mixture, and a single refrigerant. Examples of the zeotropic refrigerant mixture include R407C (R32/R125/R134a), which is an HFC (hydrofluorocarbon) refrigerant. Examples of the near-azeotropic refrigerant mixture include R410A (R32/R125) and R404A (R125/R143a/R134a), which are HFC refrigerants. In addition, examples of the single refrigerant include R22, which is an HCFC (hydrochlorofluorocarbon) refrigerant, R134a, which is an HFC refrigerant. Moreover, a natural refrigerant such as carbon dioxide, a hydrocarbon, or helium may be used.

(Various Sensors)

The air-conditioning apparatus A includes various sensors (a discharge temperature sensor $1a$, a suction temperature sensor $1b$, and temperature sensors $1c$ to $1h$). Information detected by the various sensors is, for example, sent to a control board 16, provided in the heat source unit 10, and used for controlling the air-conditioning apparatus A. These various sensors are also one of the "pre-presence-in-room environment detection means" of the present invention.

The discharge temperature sensor $1a$ is provided at the discharge side of the compressor 13, and detects the temperature of the refrigerant discharged from the compressor 13.

The suction temperature sensor $1b$ is provided at the suction side of the compressor 13, and detects the temperature of the refrigerant drawn into the compressor 13 by suction.

The temperature sensor $1c$ is provided at one of the refrigerant outlet and inlet of the heat exchanger 11, and detects the temperature of the refrigerant that is to flow into the heat exchanger 11 or the temperature of the refrigerant having flowed out of the heat exchanger 11.

The temperature sensor $1d$ is provided at the other of the refrigerant outlet and inlet of the heat exchanger 11, and detects the temperature of the refrigerant that is to flow into the heat exchanger 11 or the temperature of the refrigerant having flowed out of the heat exchanger 11.

The temperature sensor $1e$ is provided at one of the refrigerant outlet and inlet of the heat exchanger 21, and detects the temperature of the refrigerant that is to flow into the heat exchanger 21 or the temperature of the refrigerant having flowed out of the heat exchanger 21.

The temperature sensor $1f$ is provided at the other of the refrigerant outlet and inlet of the heat exchanger 21, and detects the temperature of the refrigerant that is to flow into the heat exchanger 21 or the temperature of the refrigerant having flowed out of the heat exchanger 21.

The temperature sensor $1g$ is provided at the air suction side of the heat exchanger 11, and detects the temperature of air drawn into the heat exchanger 11 by suction.

The temperature sensor $1h$ is provided at the air suction side of the heat exchanger 21, and detects the temperature of air drawn into the heat exchanger 21 by suction.

(Control Boards 16 and 23)

The air-conditioning apparatus A includes the control boards 16 and 23. The control boards 16 and 23 serve to generally control the entire system of the air-conditioning apparatus A. More specifically, the control boards 16 and 23 issue instructions associated with the operation of the air-conditioning apparatus A on the basis of information from the various sensors and user setting information according to a built-in control program. The control boards 16 and 23 are implemented using microcomputers or the like which are able to generally control the entire air-conditioning apparatus A, and control switching of the four-way valve 15, the opening degree of the expansion means 14, the driving frequency of the compressor 13, the rotation speed of the air-sending means 22, and the rotation speed of the air-sending means 12 to issue instructions associated with the operation of the air-conditioning apparatus A.

The control boards 16 and 23 are connected to each other by wireless or wired connection so as to be able to communicate with each other, and thus can exchange information with each other. Regarding allocation of the functions of the control boards 16 and 23, each unit (the heat source unit 10 and the indoor unit 20) may independently perform a control operation, one the control board can be used to provide a control instruction to the other control board by means of communication or the like. An exemplary case will be described hereinafter in which the control board 16 controls each component or device provided in the heat source unit 10, and the control board 23 controls each component or device provided in the indoor unit 20.

The control boards 16 and 23 may not be independent controllers, and may be provided as a single controller. The control boards 16 and 23 are connected to the controller 30 so that information is transmitted from the controller 30 to them. That is, the control boards 16 and 23 correspond to a "controller" of the present invention.

Figure 27:
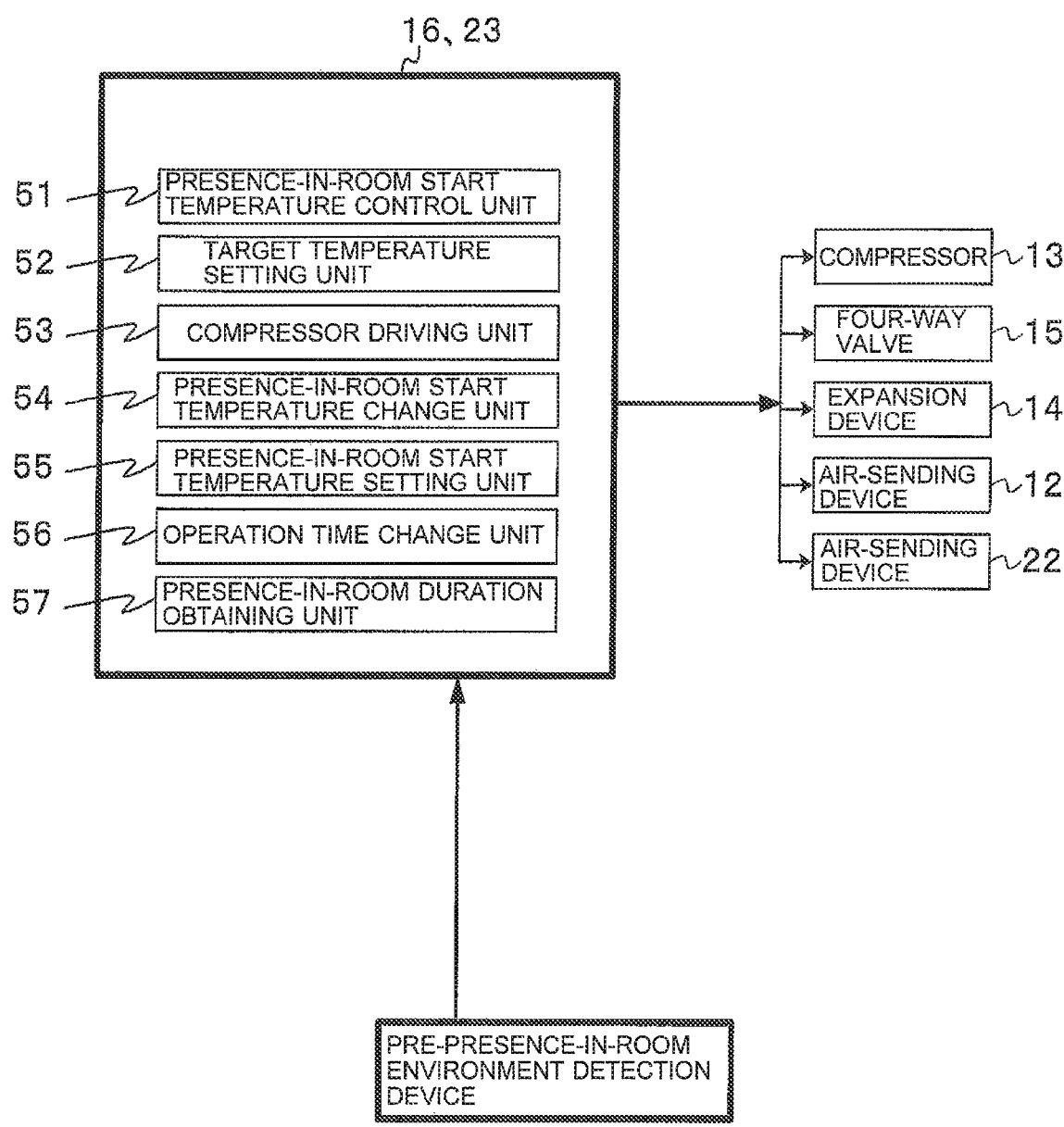
FIG. 27 is a control block diagram of a control board of the air-conditioning apparatus according to the embodiment of the present invention.

FIG. 27 is a control block diagram of the control boards 16 and 23. The control boards 16 and 23 will be described with reference to FIG. 27.

The control boards 16 and 23 include a presence-in-room start temperature control unit 51 which starts a cooling operation (precooling operation) or a heating operation (preheating operation) a predetermined time before the presence-in-room start time, determines, on the basis of a detection result obtained by the pre-presence-in-room environment detection means, whether to perform "room temperature-based target temperature control" in which a control target temperature is determined on the basis of room temperature, or "outdoor air-based target temperature control" in which a control target temperature is determined on the basis of outdoor air, and performs a control operation so as to change the presence-in-room start set time serving as a target temperature at the presence-in-room start scheduled time of the user.

The control boards 16 and 23 also include a target temperature setting unit 52 which sets the presence-in-room start set temperature to a temperature equal to or higher than a target temperature after the start of the presence of the user in the room in a precooling operation and sets the presence-in-room start set temperature to a temperature equal to or lower than the target temperature after the start of the presence of the user in the room in a preheating operation, when the presence-in-room start set temperature and the target temperature after the start of the presence of the user in the room are different from each other.

The control boards 16 and 23 moreover include a compressor driving unit 53 which drives the compressor 13 with the same operation capacity as that in a precooling operation or a preheating operation until the target temperature after the start of the presence of the user in the room is reached.

The compressor driving unit 53 is also set to operate the compressor 13 with an operation capacity kept constant at almost 50% of the maximum operation capacity, in a precooling operation or a preheating operation.

The control boards 16 and 23 include a presence-in-room start temperature change unit 54 which changes the presence-in-room start set temperature depending on whether the environment before the presence of the user in the room is indoor or outdoor.

The control boards 16 and 23 include a presence-in-room start temperature setting unit 55 which compares an outdoor temperature detected by the pre-presence-in-room environment detection means before the presence in the room with a preset upper limit temperature if it is determined, on the basis of a detection result obtained by the pre-presence-in-room environment detection means, that the environment before the presence of the user in the room is outdoor; sets, as a new presence-in-room start set temperature, a value obtained by subtracting a predetermined temperature width from the presence-in-room start set temperature, if the outdoor temperature is lower than the upper limit temperature; and sets, as a new presence-in-room start set temperature, the upper limit temperature to define a guaranteed temperature if the outdoor temperature is equal to or higher than the upper limit temperature.

Furthermore, the presence-in-room start temperature setting unit 55 may compare an indoor temperature detected by the pre-presence-in-room environment detection means before the presence in the room with a preset target set temperature if it is determined, on the basis of a detection result obtained by the pre-presence-in-room environment detection means, that the environment before the presence of the user in the room is indoor; set a presence-in-room start set temperature to the target set temperature if the absolute value of the difference between the indoor temperature and the target set temperature is lower than a predetermined determination threshold; and set the presence-in-room start set temperature as a guaranteed temperature if the absolute value of the difference between the indoor temperature and the target set temperature is equal to or higher than the determination threshold.

The control boards 16 and 23 include an operation time change unit 56 which obtains outdoor temperature variation prediction information from the pre-presence-in-room environment detection means; shortens the precooling operation time in a precooling operation and prolongs the preheating operation time in a preheating operation when the initial temperature in a predetermined section of the outdoor temperature variation prediction information is higher than a final temperature and the absolute value of the difference between the initial temperature and the final temperature is equal to or higher than a predetermined determination threshold; and prolongs the precooling operation time in a precooling operation and shortens the preheating operation time in a preheating operation when the initial temperature in the predetermined section of the outdoor temperature variation prediction information is lower than the final temperature and the absolute value of the difference between the initial temperature and the final temperature is equal to or higher than the predetermined determination threshold.

The control boards 16 and 23 include a presence-in-room duration obtaining unit 57 which collects use information of one or a plurality of devices present in the air-conditioned space (e.g., an air-conditioning apparatus, an illumination device, a human sensor, or an interior door) and obtains a presence-in-room duration of the user on the basis of the collected information.

The control board 16 serves to control the operation frequency of the compressor 13, control the rotation speed of the air-sending means 12, switch the four-way valve 15, or adjust the opening degree of the expansion means 14 on the basis of information sent from the various sensors.

The control board 23 serves to control the rotation speed of the air-sending means 22. The control board 23 also serves to transmit, to the control board 16, various pieces of information (external information obtained by the external information obtaining means 40, information detected by the load detection means 2, presence-in-room information obtained by the presence-in-room information obtaining means 50 and instruction information accepted by the controller 30 from the user) received by the receiving unit 41. The control board 23 moreover serves to transmit, to the controller 30, information which is transmitted from the control board 16 or which is determined by the control board 23 and is to be provided to the user.

«Cooling Operation of Refrigeration Cycle 1000»

A cooling operation of the refrigeration cycle 1000 will be described with reference to FIG. 2.

The refrigerant discharged from the compressor 13 flows through the four-way valve 15 into the heat exchanger 11. At that time, the heat exchanger 11 serves as a condenser, and the refrigerant condenses and liquefies when exchanging heat with air, and flows into the expansion means 14. The refrigerant is reduced in pressure by the expansion means 14, and flows into the heat exchanger 21. Since the heat exchanger 21 serves as an evaporator, the refrigerant exchanges heat with air and evaporates. At that time, the air-conditioned space a is cooled. The refrigerant having evaporated in the heat exchanger 21 flows out of the heat exchanger 21, flows through the four-way valve 15, and is drawn into the compressor 13 by suction again.

«Heating Operation of Refrigeration Cycle 1000»

A heating operation of the refrigeration cycle 1000 will be described with reference to FIG. 2.

The refrigerant discharged from the compressor 13 flows through the four-way valve 15 into the heat exchanger 21. Since the heat exchanger 21 serves as a condenser at that time, the refrigerant condenses and liquefies when exchanging heat with air. At that time, the air-conditioned space a is heated. The refrigerant as condensed in the heat exchanger 21 flows out of the heat exchanger 21 and flows into the expansion means 14. The refrigerant is reduced in pressure by the expansion means 14 and then flows into the heat exchanger 11. At that time, the heat exchanger 11 serves as an evaporator, and the refrigerant exchanges heat with air and evaporates, then flows through the four-way valve 15, and is drawn into the compressor 13 by suction again.

«Outline of Control Operation of Air-Conditioning Apparatus A»

An outline of a control operation of the air-conditioning apparatus A will be described next. The air-conditioning apparatus A performs control operations for a normal operation such as a cooling operation or a heating operation, and for a precooling operation or a preheating operation.

(Normal Operation Control Operation)

A control operation of the air-conditioning apparatus A during a normal operation will be described. The air-conditioning apparatus A starts its operation in accordance with an operation start instruction from the user who uses the air-conditioning apparatus A. The user operates, for example, the controller 30 to provide an operation start instruction to the air-conditioning apparatus A. The operation start instruction includes an operation mode such as a cooling operation, a heating operation, or the like, and an operation mode is also set in the air-conditioning apparatus A simultaneously with the operation start instruction. More specifically, the control boards 16 and 23 control drive components of the air-conditioning apparatus A to execute the operation of the air-conditioning apparatus A.

Then, the air-conditioning apparatus A executes its operation so that the measurement value obtained by the temperature sensor 1h which detects a representative temperature of the air-conditioned space a as an indoor temperature becomes a value set by the user. At that time, operation is executed so that the indoor temperature is stable around the set value. More specifically, when the temperature deviation between the indoor temperature and the set value is great, the air-conditioning apparatus A operates so as to accelerate convergence to the set value by increasing the capacity of the compressor 13 to increase the heating capacity or cooling capacity of the air-conditioning apparatus A. In addition, when the temperature deviation between the indoor temperature and the set value is small, the air-conditioning apparatus A operates so as to prevent the air-conditioned space a from being excessively heated or cooled, by decreasing the capacity of the compressor 13 to decrease the heating capacity or cooling capacity of the air-conditioning apparatus A. As described above, the air-conditioning apparatus A operates so as to stabilize the indoor temperature.

The operation capacity of the compressor 13 is preferably set to increase in proportion to, for example, the temperature difference. In this case, when the maximum capacity of the compressor 13 is assumed to be 100%, the compressor 13 is preferably controlled so that, for example, the operation capacity is 10% at a temperature difference of 0 degrees C., 40% at a temperature difference of 1 degree C., 70% at a temperature difference of 2 degrees C., and 100% at a temperature difference of 3 degrees C. or higher.

«Control Operation During Precooling Operation or Preheating Operation»

A control operation of the air-conditioning apparatus A during a precooling operation or a preheating operation will be described next.

In a precooling operation or a preheating operation by the air-conditioning apparatus A, the indoor temperature takes a predetermined set value (to be referred to as a presence-in-room start set temperature Ts hereinafter) at a time designated by the user. An exemplary control operation during a precooling operation will be described herein.

In setting a precooling operation, the user who uses the air-conditioning apparatus A sets presence-in-room information including a presence-in-room start time when the user starts to be present in the air-conditioned space a. The presence-in-room information includes, for example, the time when the user starts to be present in the room, the duration in which the user continues to be present in the room, and the time when the user becomes absent. Regarding the presence-in-room information, when the user sets time-of-day/time information as the presence-in-room information in advance, the presence-in-room information set by the user serves as a reference. However, in actual use of the air-conditioning apparatus A, since presence-in-room information is assumed to be different day by day, a time zone having a width may be estimated and set as presence-in-room information by using the past information of a device present in the air-conditioned space a (e.g., the controller 30).

When presence-in-room information is set by using the past information of a device present in the air-conditioned space a, in the air-conditioning apparatus A, it is desired to store the time when the user has initially operated the device with the controller 30 or the like in a predetermined time zone of the day (e.g., a time zone such as morning, midday, evening, or night), collect the information of the time daily, and estimate and set a presence-in-room start time zone on the basis of the collection result. That is, in the air-conditioning apparatus A, the earliest operation start time and the latest operation start time, among the respective pieces of collected information, can be stored, and the time zone between the respective times can be set as a presence-in-room start time zone.

When a large number of pieces of presence-in-room start information are obtained, statistical processing may be performed and a presence-in-room start time zone may be determined by using a time different from the average by a standard deviation. Alternatively, instead of collecting an operation history of the controller 30 by a presence-in-room detection means as described above, human detection information obtained by a human sensor or the like which is provided to the air-conditioning apparatus A or another device and uses infrared rays or the like, open/close information of an interior door mounted in the air-conditioned space a, use information of an illumination device mounted in the air-conditioned space a, or the like may be collected and used as presence-in-room information.

Presence-in-room information can also be obtained in a space other than the air-conditioned space a, and be shared by the controller 30 or the like. For example, a presence-in-room state in another room, or information indicating that no one is present in a house can be obtained by a control device (e.g., a controller 30) of an air-conditioning apparatus in each room, and shared. To obtain presence-in-room information, the user may input and set a presence-in-room time and an outgoing time in advance, instead of obtaining information by a sensor.

The air-conditioning apparatus A starts a precooling operation so that the presence-in-room start set temperature Ts can be reached. The time required to decrease the indoor temperature is proportional to the temperature difference between the presence-in-room start set temperature Ts and the indoor temperature at the start of the operation of the air-conditioning apparatus A, and thus the operation time required to decrease the temperature by 1 degree C. (to be referred to as an operation time T hereinafter) is determined in advance on the basis of the operation characteristics of the air-conditioning apparatus A. Then, in the air-conditioning apparatus A, the operation time T is multiplied by the temperature difference between the indoor temperature at the start of the operation of the air-conditioning apparatus A and the indoor temperature set value, and a time obtained by making the earliest time in the presence-in-room start time zone earlier by this time is set as an operation start time for the air-conditioning apparatus A. The air-conditioning apparatus A starts a precooling operation at the operation start time.

Next, as the operation capacity of the compressor 13 of the air-conditioning apparatus A after the start of the precooling operation, the compressor 13 is basically operated with a constant capacity. The capacity of the compressor 13 kept constant at that time is assumed to be an operation capacity of the air-conditioning apparatus A which is used in defining the operation time T. The compressor 13 is operated with such an operation capacity, so that the presence-in-room start set temperature Ts is achieved at a time around the earliest time in the presence-in-room start time zone. The operation capacity of the compressor 13 at that time is set so as to increase the operation efficiency of the air-conditioning apparatus A.

In general, the lower the operation capacity of the compressor 13 is, the higher the operation efficiency of the air-conditioning apparatus A is. However, if the operation capacity of the compressor 13 is excessively low, the operation efficiency of the compressor 13 may decrease, or the air-conditioning capacity may decrease so that the precooling operation time is excessively prolonged. Thus, the operation capacity of the compressor 13 after the start of the precooling operation is preferably set to approximately 50% of the maximum operation capacity of the compressor 13.

Then, during the precooling operation, in the period after the indoor temperature decreases and the presence-in-room start set temperature Ts is achieved and before the start of the presence in the room, the air-conditioning apparatus A changes the operation method, and controls the operation capacity of the compressor 13 so that the indoor temperature is kept at the presence-in-room start set temperature Ts, similarly to a control operation during a normal operation.

After the start of the presence of the user in the room, when a target temperature Tm is lower than the presence-in-room start set temperature Ts, the operation capacity of the compressor 13 is controlled so that the operation efficiency of the air-conditioning apparatus A is increased, similarly to the precooling operation. On the other hand, when the target temperature Tm and the presence-in-room start set temperature Ts are equal to each other, the operation capacity of the compressor 13 is controlled so that the indoor temperature is kept at the target temperature Tm, similarly to a control operation during a normal operation. In addition, when an operation for changing the target temperature Tm is performed using the controller 30 or the like by the user after the start of the presence of the user in the room, the compressor 13 is controlled so that the indoor temperature becomes Tm, similarly to a normal control operation.

Figure 3:
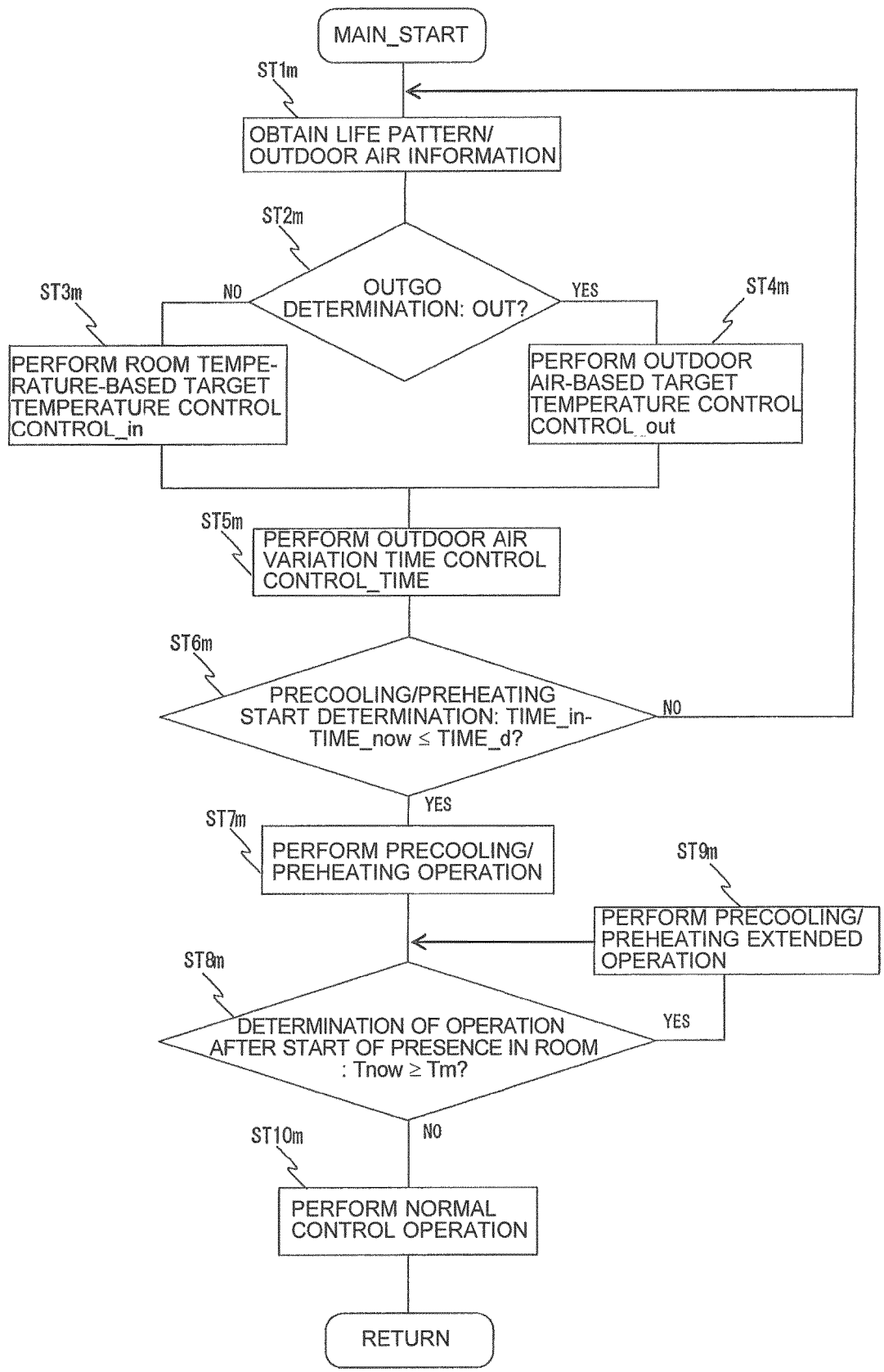
FIG. 3 is a flowchart showing the sequence of a control operation during a precooling operation or a preheating operation executed by the air-conditioning apparatus according to the embodiment of the present invention.

The sequence of a control operation that is the main control operation during a precooling operation or a preheating operation by the air-conditioning apparatus A will be described with reference to a flowchart shown in FIG. 3. FIG. 3 is a flowchart showing the sequence of a control operation during a precooling operation or a preheating operation by the air-conditioning apparatus A. The control boards 16 and 23 mainly perform the control operation, but their operations or arrangements will not sometimes be referred to for the sake of convenience of explanation.

The controller 30 of the air-conditioning apparatus A obtains life pattern information of the air-conditioned space a and outdoor air information through the presence-in-room information obtaining means 50 (step ST1m). The life pattern information includes, for example, the time when the user starts to be present in the room, the duration in which the user continues to be present in the room, and the time when the user becomes absent. The presence-in-room information such as the time, the duration, or the like is set by a past statistic value or an input value. The outdoor air information is the temperature variation history and the current temperature, and is obtained by the controller 30 from the temperature sensor 1h of the outdoor unit or from an external weather information forecast system via the Internet by means of the external information obtaining means 40 and the receiving unit 41 as the temperature and the amount of solar radiation of a day, and predicted variation information of the wind direction and speed of outdoor air.

Next, on the basis of the relationship of presence-in-room information of each room or a presence-in-room scheduled time input in advance, it is determined whether to perform "room temperature-based target temperature control CONTROL_in" in which a control target temperature for a precooling operation or a preheating operation is determined on the basis of room temperature, or "outdoor air-based target temperature control CONTROL_out" in which a control target temperature for a precooling operation or a preheating operation is determined on the basis of outdoor air (step ST2m). The "room temperature-based target temperature control CONTROL_in" will be described in detail later with reference to FIGS. 4 and 5. The "outdoor air-based target temperature control CONTROL_out" will be described in detail later with reference to FIGS. 6 and 7.

If a person who is scheduled to be present in the room is indoor before the presence in the room, the control process proceeds to step ST3m, in which the "room temperature-based target temperature control CONTROL_in" is performed.

On the other hand, if the person who is scheduled to be present in the room is outdoor before the presence in the room, the control process proceeds to step ST4m, in which "outdoor air-based target temperature control CONTROL_out" is performed.

Then, after the "room temperature-based target temperature control CONTROL_in" in step ST3m or "outdoor air-based target temperature control CONTROL_out" in step ST4m, the control process proceeds to step ST5m.

In step ST5m, "outdoor air variation time control CONTROL_TIME" in which the precooling start time is corrected on the basis of a variation of the outdoor air is performed after the "room temperature-based target temperature control CONTROL_in" or the "outdoor air-based target temperature control CONTROL_out" is performed. In this case, a precooling time TIME_d is determined on the basis of a temporal variation in outdoor temperature. The "outdoor air variation time control CONTROL_TIME" will be described in detail later with reference to FIG. 8.

In step ST6m, on the basis of the relationship among the precooling time TIME_d determined in step ST5m, a current time TIME_now, and a presence-in-room start time TIME_in, it is determined whether to start a precooling operation. If the difference between the presence-in-room start time TIME_in and the current time TIME_now is equal to or smaller than the precooling time TIME_d, the control process proceeds to step STm7, and a precooling operation is started.

On the other hand, if the difference between the presence-in-room start time TIME_in and the current time TIME_now is larger than the precooling time TIME_d, a life pattern and outdoor air information are obtained in step ST1m again.

In step ST7m, a precooling operation is executed. In the precooling operation, the compressor 13 is operated with a low capacity, thereby improving the device efficiency. The precooling operation ends after elapse of the precooling time TIME_d, and then operation after the start of the presence in the room is determined in step ST8m.

In step ST8m, the precooling operation ends, and it is determined whether to perform a precooling/preheating extended operation in step ST9m, in which air-conditioning control similar to that in a precooling operation is performed, or a normal control operation in step ST10m after the start of the presence in the room. If the current room temperature Tnow is equal to or higher than an air-conditioning target temperature Tm, the control process proceeds to step ST9m, in which a precooling/preheating extended operation is performed. If the current room temperature Tnow is lower than the air-conditioning target temperature Tm, the control process proceeds to step ST10m, in which a normal control operation is performed.

(Room Temperature-Based Target Temperature Control)

Figure 4:
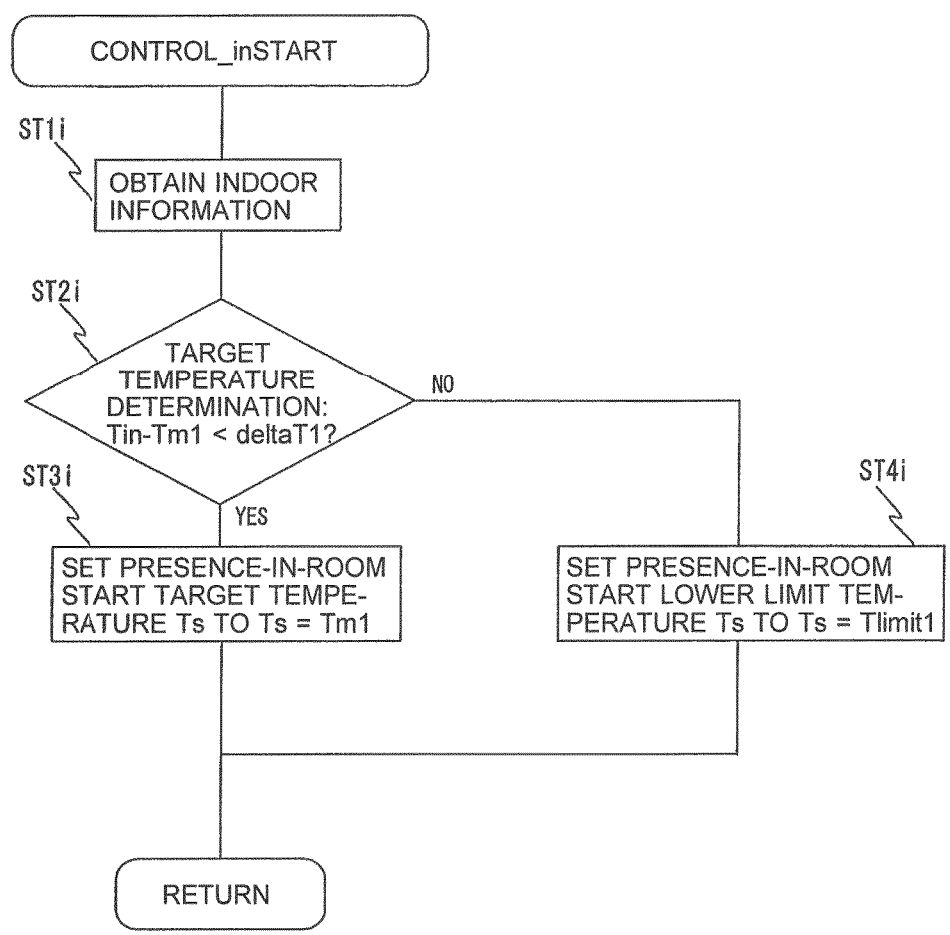
FIG. 4 is a flowchart showing the sequence of an indoor-based target temperature control process of the air-conditioning apparatus according to the embodiment of the present invention.

The room temperature-based target temperature control CONTROL_in will be described with reference to FIG. 4. FIG. 4 is a flowchart showing the sequence of an indoor-based target temperature control process of the air-conditioning apparatus A. A method of setting the presence-in-room start set temperature Ts in a precooling operation will be described herein. The control boards 16 and 23 mainly perform the control operation, but their operations or arrangements will not sometimes be referred to for the sake of convenience of explanation.

The controller 30 obtains indoor temperature information Tin from the load detection means 2 or the temperature sensor 1h (step ST1i).

Then, a target temperature is determined by using the obtained indoor temperature information Tin (step ST2i). In step ST2i, the presence-in-room start set temperature Ts is determined on the basis of the relationship between the indoor temperature information Tin of the indoor temperature information obtained in step ST1i and a target set temperature Tm1. More specifically, in step ST2i, the difference between the indoor temperature information Tin and the target set temperature Tm1 is compared with a determination threshold deltaT1.

If the absolute value of the difference between the indoor temperature information Tin and the target set temperature Tm1 is smaller than the determination threshold deltaT1 (YES in step ST2i), the presence-in-room start set temperature Ts is set to the target set temperature Tm1 (step ST3i). On the other hand, if the absolute value of the difference between the indoor temperature information Tin and the target set temperature Tm1 is equal to or larger than the determination threshold deltaT1 (NO in step ST2i), the presence-in-room start set temperature Ts is set to a guaranteed temperature Tlimit1 (step ST4i).

Figure 5:
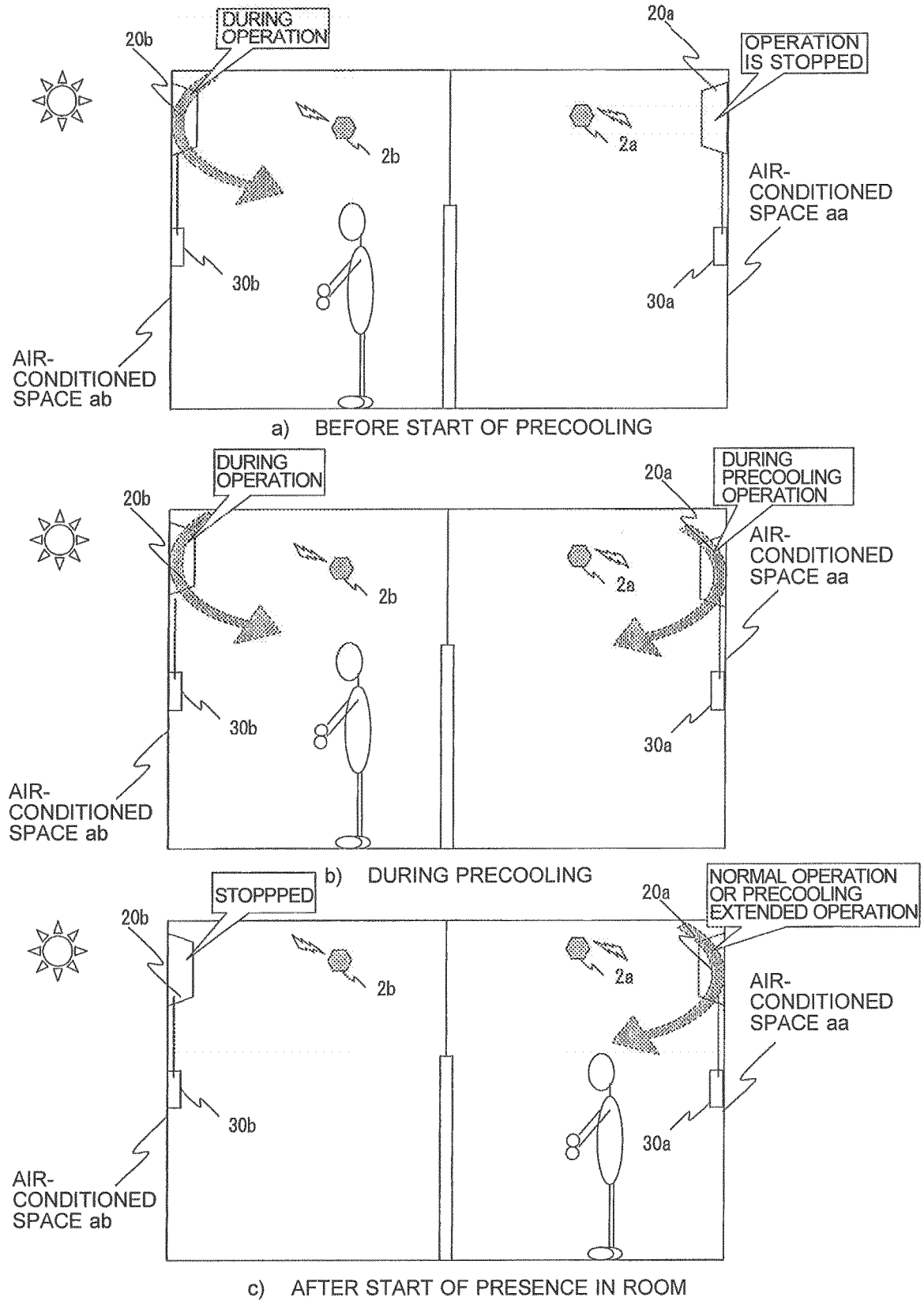
FIG. 5 is a schematic diagram showing the operation state during an indoor-based target temperature control operation of the air-conditioning apparatus according to the embodiment of the present invention.

The target set temperature Tm1 will be described herein with reference to FIG. 5. FIG. 5 is a schematic diagram showing the operation state during an indoor-based target temperature control operation of the air-conditioning apparatus A. Referring to FIG. 5, the air-conditioned space a after the start of the presence of the user in the room is shown as an air-conditioned space aa, and the air-conditioned space a in which the user has been present before the start of the presence in the room is shown as an air-conditioned space ab. FIG. 5 shows in (a) the operation state of the air-conditioning apparatus A before the start of precooling, in (b) the operation state of the air-conditioning apparatus A during precooling, and in (c) the operation state of the air-conditioning apparatus A after the start of the presence of the user in the room. In addition, FIG. 5 shows in (a) a state in which the user is present in the air-conditioned space ab, in (b) a state in which the user is present in the air-conditioned space ab, and in (c) a state in which the user is present in the air-conditioned space aa.

An indoor unit 20a, a load detection means 2a, and a controller 30a are disposed in the air-conditioned space aa, and an indoor unit 20b, a load detection means 2b, and a controller 30b are disposed in the air-conditioned space ab. Each of the indoor units 20a and 20b is identical to the indoor unit 20. Each of the load detection means 2a and 2b is identical to the load detection means 2. Each of the controllers 30a and 30b is identical to the controller 30.

Assume that the user starts to be present in the air-conditioned space aa at the presence-in-room start time TIME_in. The target set temperature Tm1 is the temperature of the air-conditioned space ab in which the user has been present before the start of the presence in the room, and is equal to the temperature of air drawn by suction by the load detection means 2b or the indoor unit 20b. The detected target set temperature Tm1 is shared by the controller 30a via the controller 30b or another communication device. The communication scheme may be wireless or wired communication, or a scheme of inputting information to the controller 30a in advance, and is not limited to that according to the embodiment.

Before the start of precooling as shown in (a) of FIG. 5, the operation of the indoor unit 20a in the air-conditioned space aa is stopped, and the indoor unit 20b in the air-conditioned space ab is operated at the target set temperature Tm1.

During precooling as shown in (b) of FIG. 5, the indoor unit 20a in the air-conditioned space aa is operated at a presence-in-room set temperature as the target set temperature Tm1 or the guaranteed temperature Tlimit1, and the indoor unit 20b in the air-conditioned space ab is operated at the target set temperature Tm1.

After the presence-in-room start time TIME_in in which the user is present in the air-conditioned space aa as shown in (c) of FIG. 5, the indoor unit 20a in the air-conditioned space aa performs a normal operation or a precooling/preheating extended operation at the air-conditioning target temperature Tm, and the operation of the indoor unit 20b in the air-conditioned space ab is stopped.

(Outdoor Air-Based Target Temperature Control)

Figure 6:
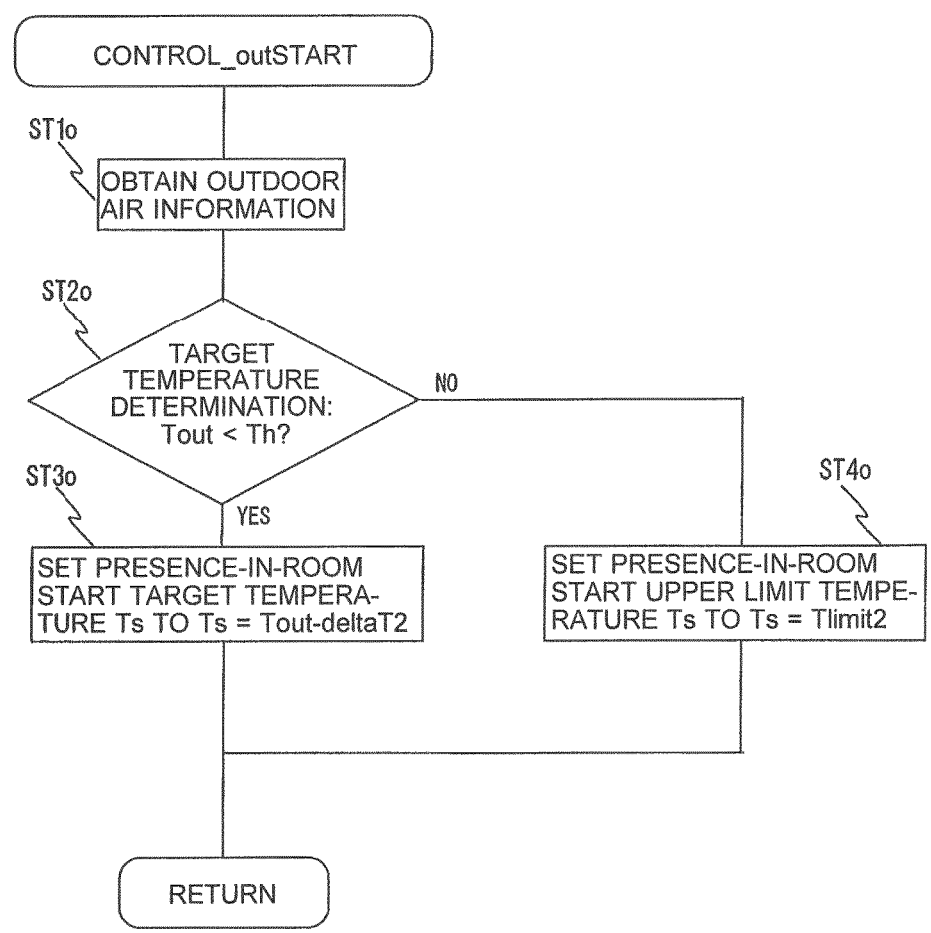
FIG. 6 is a flowchart showing the sequence of an outdoor air-based target temperature control process of the air-conditioning apparatus according to the embodiment of the present invention.

The outdoor air-based target temperature control CONTROL_out will be described with reference to FIG. 6. FIG. 6 is a flowchart showing the sequence of an outdoor air-based target temperature control process of the air-conditioning apparatus A. A method of setting the presence-in-room start set temperature Ts in a precooling operation will be described herein. The control boards 16 and 23 mainly perform the control operation, but their operations or arrangements will not sometimes be referred to for the sake of convenience of explanation.

The controller 30 obtains outdoor temperature information from the load detection means 2 or the temperature sensor 1g (step ST1o).

Then, a target temperature is determined by using the obtained outdoor temperature information (step ST2o). In step ST2o, the presence-in-room start set temperature Ts is determined on the basis of the relationship between an outdoor temperature Tout of the outdoor temperature information obtained in step ST1o and an upper limit temperature Th. More specifically, in step ST2o, the outdoor temperature Tout is compared with the upper limit temperature Th. The upper limit temperature Th takes a predetermined value at least externally set in advance.

If the outdoor temperature Tout is lower than the upper limit temperature Th (YES in step ST2o), the presence-in-room start set temperature Ts is set to a value obtained by subtracting a temperature width deltaT2 from the outdoor temperature Tout (step ST3o). On the other hand, if the outdoor temperature Tout is equal to or higher than the upper limit temperature Th (NO in step ST2o), the presence-in-room start set temperature Ts is set to a presence-in-room start upper limit temperature Tlimit2 serving as a guaranteed temperature (step ST4o).

Figure 7:
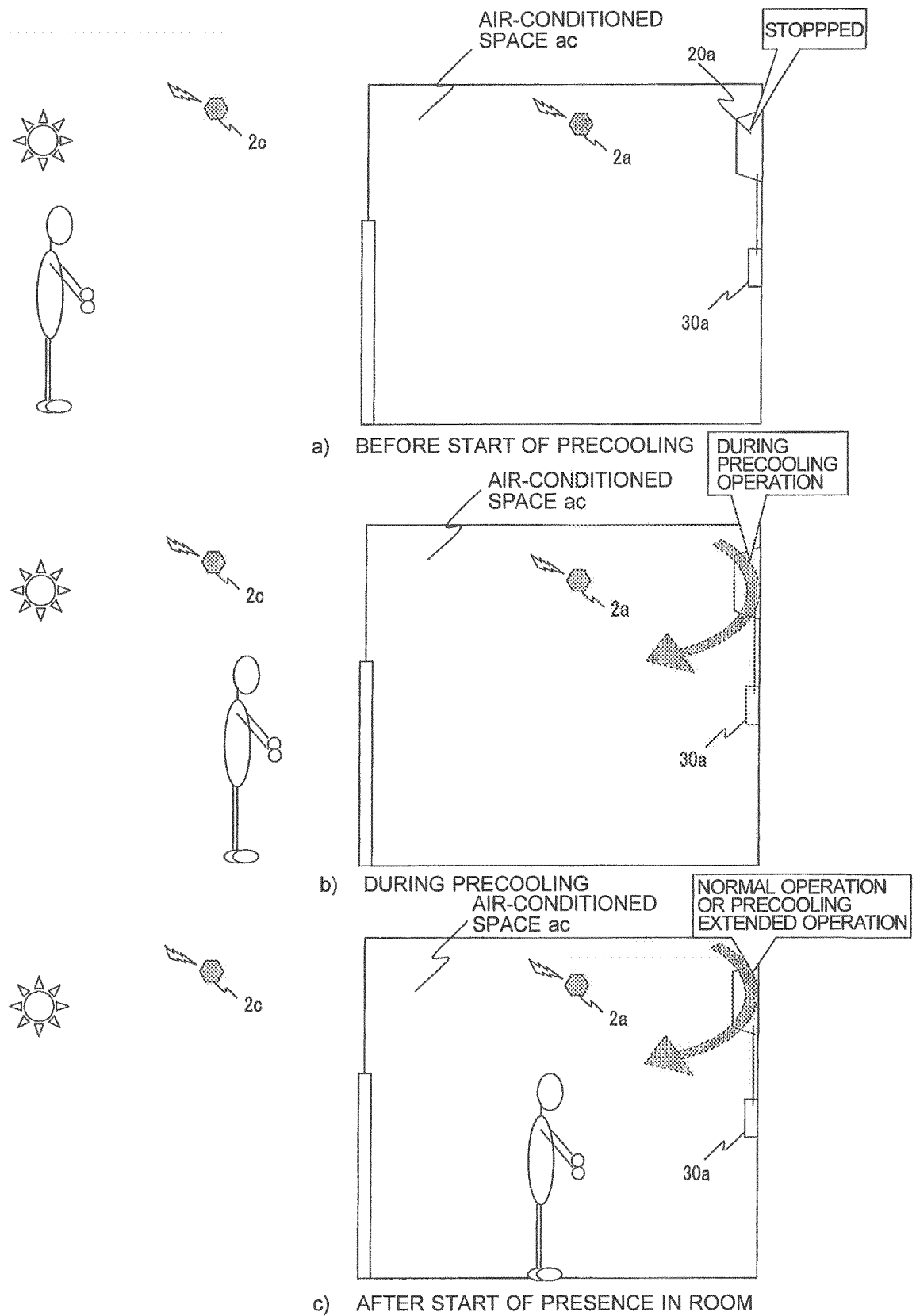
FIG. 7 is a schematic diagram showing the operation state during an outdoor air-based target temperature control operation of the air-conditioning apparatus according to the embodiment of the present invention.

The operation state of the air-conditioning apparatus A will be described herein with reference to FIG. 7. FIG. 7 is a schematic diagram showing the operation state during an outdoor air-based target temperature control operation of the air-conditioning apparatus A. Referring to FIG. 7, the air-conditioned space a after the start of the presence in the room is defined as an air-conditioned space ac, and the user is outdoors (at the same position as that where the outdoor temperature can be obtained) before the start of the presence in the room. FIG. 7 shows in (a) the operation state of the air-conditioning apparatus A before the start of precooling, in (b) the operation state of the air-conditioning apparatus A during precooling, and in (c) the operation state of the air-conditioning apparatus A after the start of the presence of the user in the room.

An indoor unit 20a, a load detection means 2a, and a controller 30a are disposed in the air-conditioned space ac, and a load detection means 2c is disposed outdoors. The user starts to be present in the air-conditioned space ac at the presence-in-room start time TIME_in.

The outdoor temperature Tout is the temperature of air drawn by suction by the load detection means 2c or the outdoor unit. The detected outdoor temperature Tout is shared by the controller 30a via a communication device. The communication scheme may be wireless or wired communication, additional external information (a weather forecast or an air temperature variation) may be transmitted by using the external information obtaining means 40 via the Internet to the controller 30a, and the communication scheme is not limited to that according to the embodiment.

Before the start of precooling as shown in (a) of FIG. 7, the operation of the indoor unit 20a in the air-conditioned space ac is stopped.

During precooling as shown in (b) of FIG. 7, the indoor unit 20a in the air-conditioned space ac is operated at a presence-in-room set temperature set as (Tout-deltaT2) or Tlimit2.

After the presence-in-room start time TIME_in in which the user is present in the air-conditioned space ac as shown in (c) of FIG. 7, the indoor unit 20a in the air-conditioned space ac performs a normal operation or a precooling/preheating extended operation at the air-conditioning target temperature Tm.

(Outdoor Air Variation Time Control)

Figure 8:
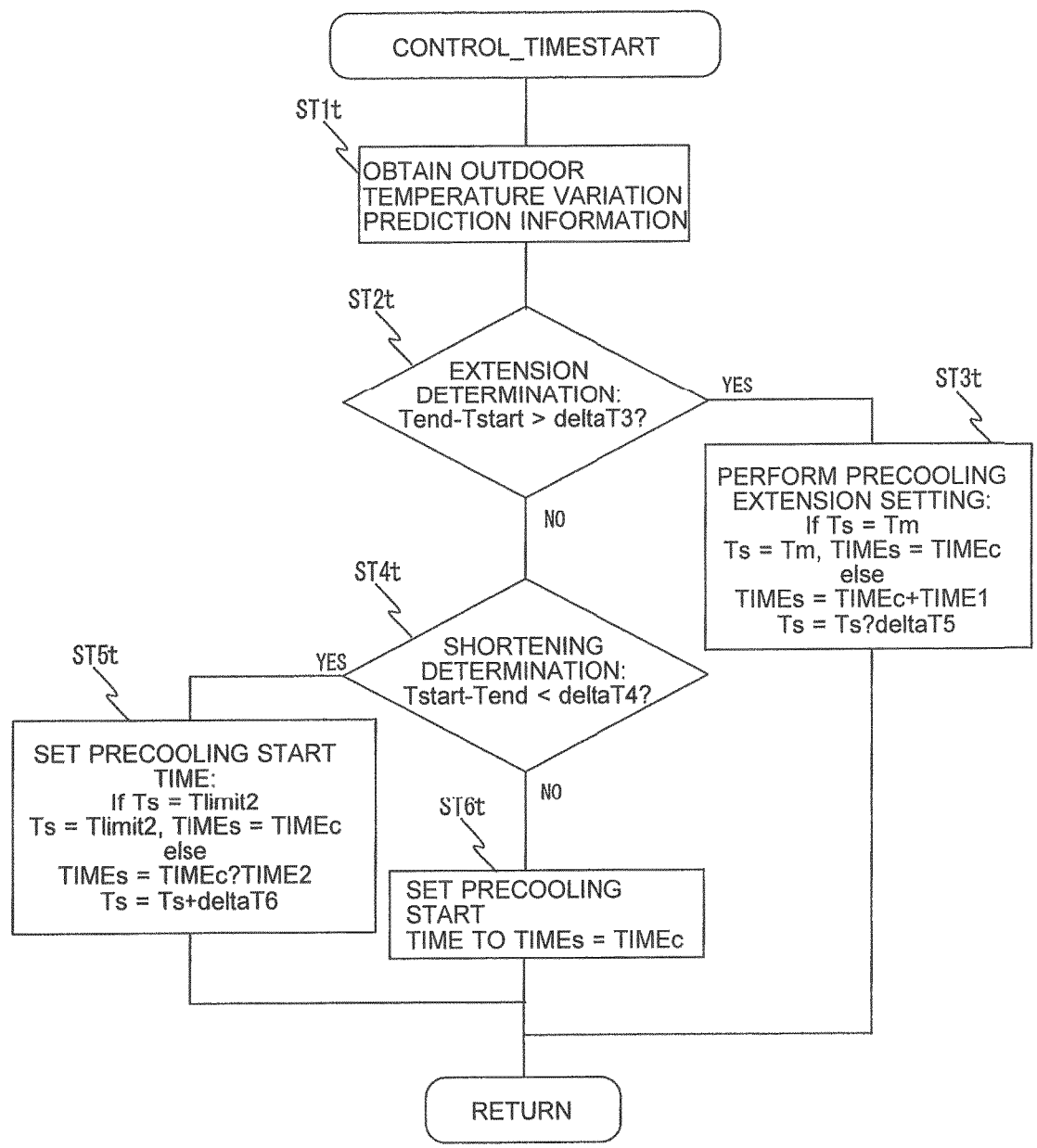
FIG. 8 is a flowchart showing the sequence of an outdoor air variation time control process of the air-conditioning apparatus according to the embodiment of the present invention.

The outdoor air variation time control CONTROL_TIME of the air-conditioning apparatus A will be described with reference to FIG. 8. A method of setting a precooling time TIMEs in a precooling operation will be described herein. FIG. 8 is a flowchart showing the sequence of an outdoor air variation time control process of the air-conditioning apparatus A. The control boards 16 and 23 mainly perform the control operation, but their operations or arrangements will not sometimes be referred to for the sake of convenience of explanation.

The controller 30 obtains outdoor temperature variation prediction information from the load detection means 2c or the temperature sensor 1e (step ST1t).

Then, extension determination is performed by using an initial temperature Tstart and a final temperature Tend in a predetermined section of the obtained outdoor temperature variation prediction information (step ST2t). In step ST2t, the presence-in-room start set temperature Ts is determined on the basis of the relationship between the initial temperature Tstart and the final temperature Tend of the outdoor temperature variation prediction information obtained in step ST1t. More specifically, in step ST2t, the absolute value of the difference between the initial temperature Tstart and the final temperature Tend is compared with a determination threshold deltaT3.

If the final temperature Tend is higher than the initial temperature Tstart by the determination threshold deltaT3 or more, and the presence-in-room start set temperature Ts is different from the air-conditioning target temperature Tm (YES in step ST2t), the precooling time TIMEs is changed by prolonging by TIME1 a precooling time TIMEc for a constant temperature, and reducing the presence-in-room start set temperature by deltaT5 in correspondence with the prolonged operation time (step ST3t). In a preheating operation, the preheating operation time is shortened in step ST3t. Otherwise (NO in step ST2t), shortening determination is performed (step ST4t).

In step ST4t, the presence-in-room start set temperature Ts is determined on the basis of the relationship between the initial temperature Tstart and the final temperature Tend of the outdoor temperature variation prediction information obtained in step ST1t. More specifically, in step ST4t, the difference between the initial temperature Tstart and the final temperature Tend is compared with a determination threshold deltaT4.

If the initial temperature Tstart is higher than the final temperature Tend by the determination threshold delta T4 or more, and the presence-in-room set temperature is different from the presence-in-room start upper limit temperature Tlimit2 (YES in step ST4t), the precooling time TIMEs is changed by shortening by TIME2 the precooling time TIMEc for a constant temperature, and increasing the presence-in-room start set temperature by delta T6 in correspondence with the shortened operation time (step ST5t). In a preheating operation, the preheating operation time is prolonged in step ST5t. Otherwise (NO in step ST4t), precooling is started at a precooling start time set as TIMEc (step ST6t).

The outdoor temperature Tout is the temperature of air drawn by suction by the load detection means 2c or the outdoor unit. The detected outdoor temperature Tout is shared by the controller 30a via a communication device. The communication scheme may be wireless or wired communication, additional external information (a weather forecast or an air temperature variation) may be transmitted by using the external information obtaining means 40 via the Internet to the controller 30a, and the communication scheme is not limited to that according to the embodiment.

In addition, with the control method of the embodiment, it is important to obtain highly accurate presence-in-room duration information, and thus presence-in-room information may be set based not only on information associated with the air-conditioned space a but also on the life pattern of the entire household. In one example, an HEMS (home energy management system) which monitors the states of devices in the entire house may be additionally introduced, and presence-in-room information may be processed by the system. Then, the presence-in-room information may be transmitted to the air-conditioning apparatus A and used for a precooling operation or a preheating operation by the air-conditioning apparatus A.

«Specific Action of Precooling and Preheating Control Operations of Air-Conditioning Apparatus A»

A specific action of precooling and preheating control operations of the air-conditioning apparatus A will be described next with reference to FIGS. 9 to 26. Precooling and preheating control operations by an existing air-conditioning apparatus, as will be described below, mean control operations in which precooling and preheating operations are performed for a predetermined time before the start of the presence of the user in the room, and an indoor target temperature is reached after the end of precooling and preheating.

A specific action of a precooling control operation will be described first with reference to FIGS. 9 to 17.

A specific action of a precooling control operation when the outdoor temperature in a precooling start time zone is lower than the temperature after the start of the presence in the room (e.g., in the early morning of summer) in a cooling period will be described with reference to FIGS. 9 to 11.

A specific action of a precooling control operation when the outdoor temperature in a precooling start time zone is almost equal to the temperature after the start of the presence in the room (e.g., during midday in summer) in a cooling period will be described with reference to FIGS. 12 to 14.

A specific action of a precooling control operation when the outdoor temperature in a precooling start time zone is higher than the temperature after the start of the presence in the room (e.g., in the evening of summer) in a cooling period will be described with reference to FIGS. 15 to 17.

(Cooling Period (e.g., in Early Morning of Summer))

Figure 9:
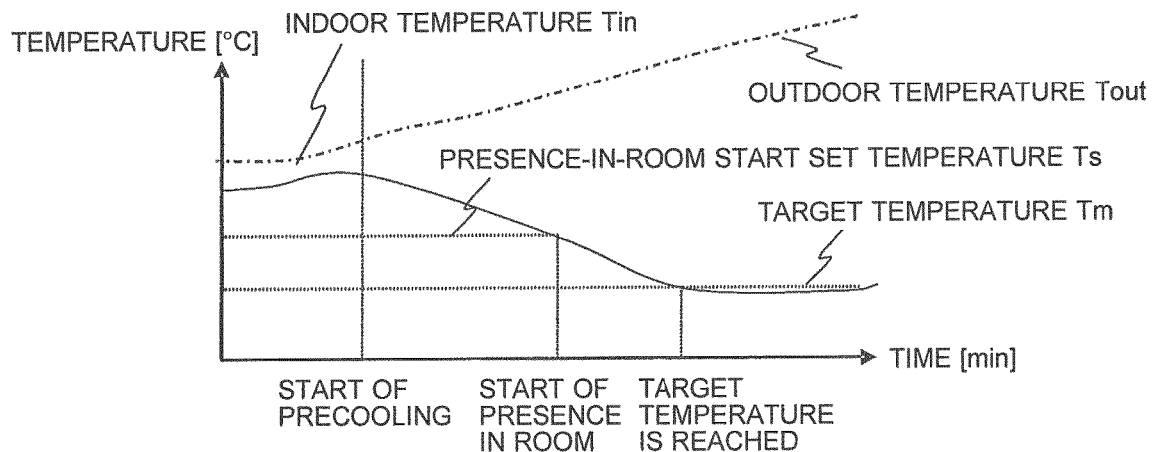
FIG. 9 is a temperature diagram showing a precooling control operation of the air-conditioning apparatus according to the embodiment of the present invention when the temperature is low at the start of precooling.

FIG. 9 is a temperature diagram showing a precooling control operation of the air-conditioning apparatus A when the temperature is low at the start of precooling. FIG. 10 is a temperature diagram showing a precooling control operation of the existing air-conditioning apparatus when the temperature is low at the start of precooling. FIG. 11 is a power consumption diagram showing a change in power consumption of each of the air-conditioning apparatus A and the existing air-conditioning apparatus during the precooling control operation when the temperature is low at the start of precooling. Referring to FIGS. 9 and 10, the abscissa indicates time, and the ordinate indicates temperature. Referring to FIG. 11, the abscissa indicates time, and the ordinate indicates power consumption.

Figure 10:
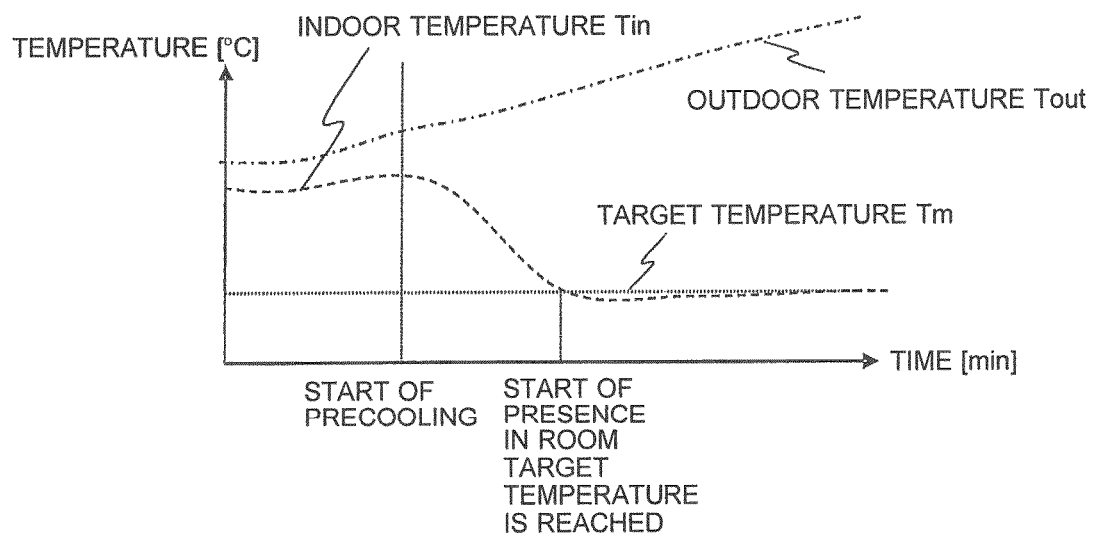
FIG. 10 is a temperature diagram showing a precooling control operation of an existing air-conditioning apparatus when the temperature is low at the start of precooling.
Figure 11:
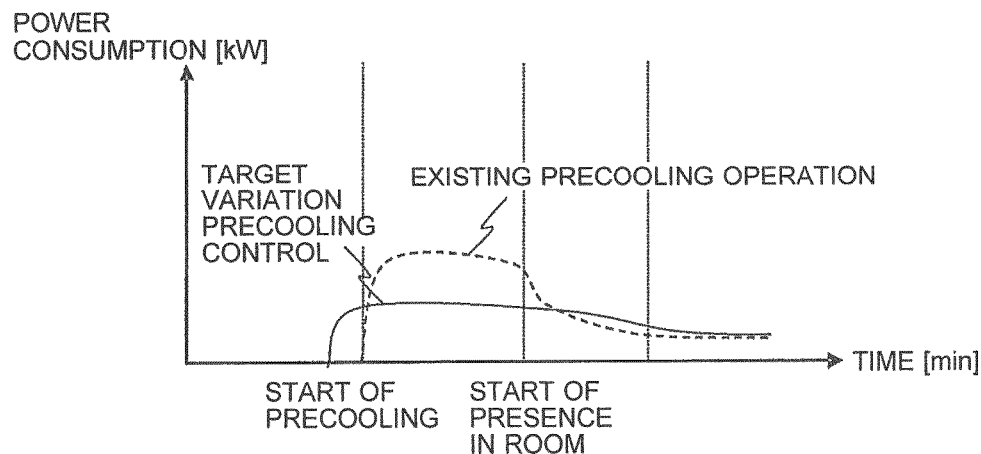
FIG. 11 is a power consumption diagram showing a change in power consumption of each of the air-conditioning apparatus according to the embodiment of the present invention and the existing air-conditioning apparatus during the precooling control operation when the temperature is low at the start of precooling.

As shown in FIGS. 9 to 11, in a cooling period (e.g., in the early morning of summer), regardless of whether the room temperature-based target temperature control CONTROL_in or the outdoor air-based target temperature control CONTROL_out is done, the outdoor temperature is lower before the start of the presence of the user in the room. Thus, if the amount of air blown by the air-sending means 12 of the heat source unit 10 is the same, before the start of the presence of the user in the room, a higher refrigeration cycle efficiency can be attained upon a decrease in condensing temperature, and load processing can be performed more efficiently than at the start of the presence in the room by prolonging the precooling time before the start of the presence in the room than at the start of the presence in the room. FIGS. 9 and 11 illustrate an exemplary process of a low-capacity operation.

In addition, as shown in FIG. 9, the amount of load processed during the precooling time is reduced by individually setting the presence-in-room start set temperature Ts and the air-conditioning target temperature Tm after the start of the presence in the room, and setting the air-conditioning target temperature Tm to a temperature lower than the presence-in-room start set temperature Ts. Thus, a decrease in precooling time or a low-capacity operation can be achieved (see FIGS. 9 and 10), and energy saving can be achieved by reducing the operation time accumulated in a day or increasing the device efficiency upon a low-capacity operation (see FIG. 11).

Furthermore, since the presence-in-room start set temperature Ts is close to the space temperature before the presence in the room, except for the case of generation of an excessive load, the temperature difference has little influence on the human body, thus improving the level of comfort. That is, with the air-conditioning apparatus A, in, for example, movement from a bedroom (28 degrees C.) to a living room (26 degrees C.), operation is performed so that the temperature in the living room is kept at 28 degrees C. until the start of the presence in the living room, and then a cooling operation is performed to decrease the temperature to 26 degrees C., thereby reducing the burden imposed on the human body while a satisfactory level of comfort is maintained.

(Cooling Period (e.g., During Midday in Summer))

Figure 12:
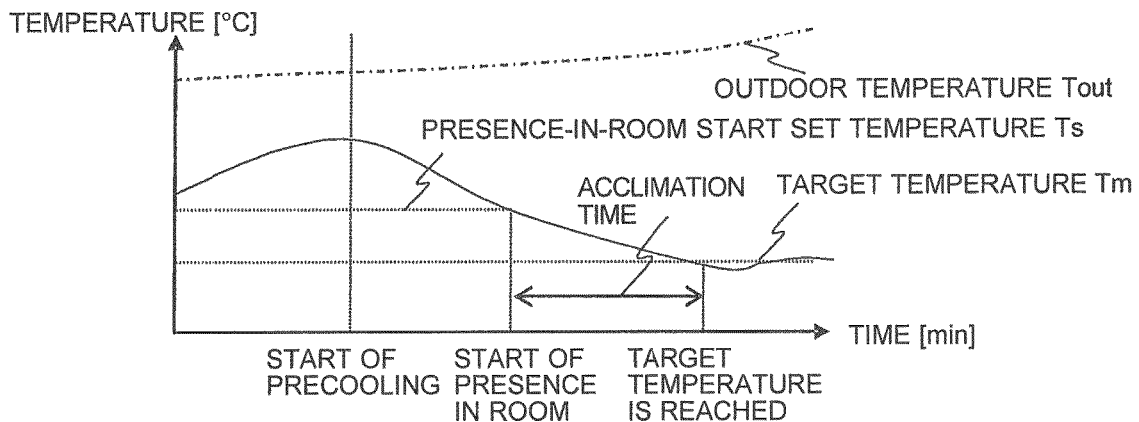
FIG. 12 is a temperature diagram showing a precooling control operation of the air-conditioning apparatus according to the embodiment of the present invention when the outdoor temperature and the temperature after the start of the presence in the room are almost equal to each other at the start of precooling.

FIG. 12 is a temperature diagram showing a precooling control operation of the air-conditioning apparatus A when the outdoor temperature and the temperature after the start of the presence in the room are almost equal to each other at the start of precooling. FIG. 13 is a temperature diagram showing a precooling control operation of the existing air-conditioning apparatus when the outdoor temperature and the temperature after the start of the presence in the room are almost equal to each other at the start of precooling. FIG. 14 is a power consumption diagram showing a change in power consumption of each of the air-conditioning apparatus A and the existing air-conditioning apparatus during the precooling control operation when the outdoor temperature and the temperature after the start of the presence in the room are almost equal to each other at the start of precooling. Referring to FIGS. 12 and 13, the abscissa indicates time, and the ordinate indicates temperature. Referring to FIG. 14, the abscissa indicates time, and the ordinate indicates power consumption.

Figure 13:
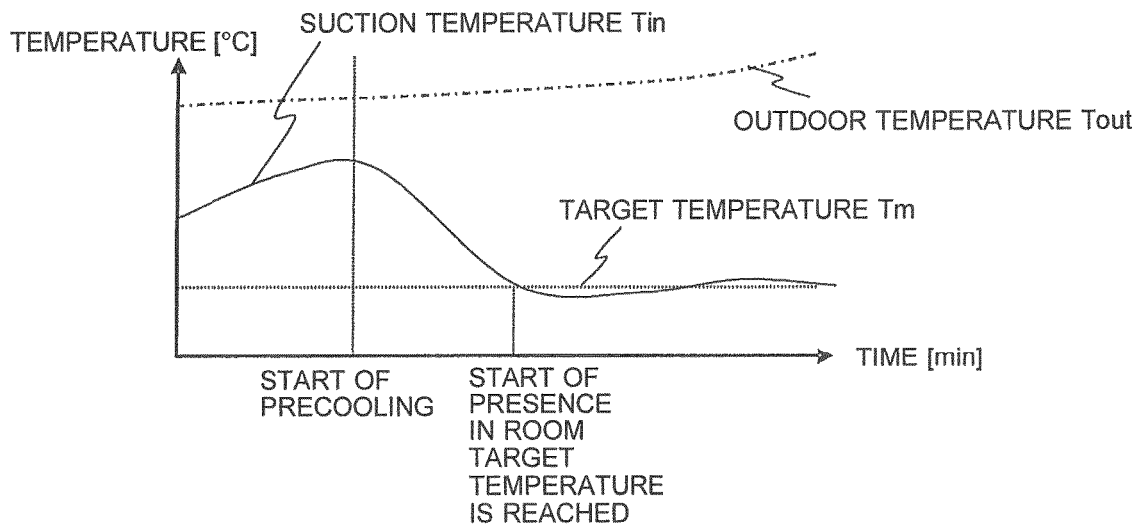
FIG. 13 is a temperature diagram showing a precooling control operation of the existing air-conditioning apparatus when the outdoor temperature and the temperature after the start of the presence in the room are almost equal to each other at the start of precooling.
Figure 14:
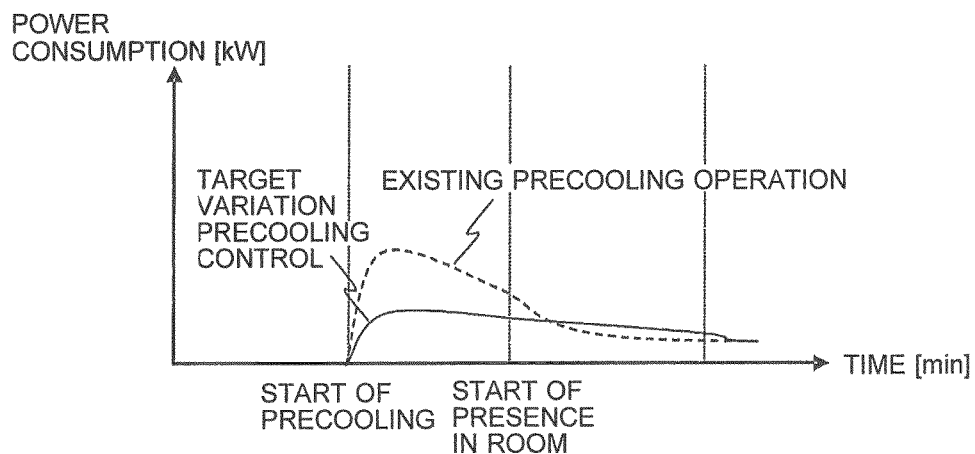
FIG. 14 is a power consumption diagram showing a change in power consumption of each of the air-conditioning apparatus according to the embodiment of the present invention and the existing air-conditioning apparatus during the precooling control operation when the outdoor temperature and the temperature after the start of the presence in the room are almost equal to each other at the start of precooling.

As shown in FIGS. 12 to 14, in a cooling period (e.g., during midday in summer), regardless of whether the room temperature-based target temperature control CONTROL_in or the outdoor air-based target temperature control CONTROL_out is done, the temperature varies less before and after the start of the presence in the room. Thus, the precooling time remains unchanged from the time for a constant temperature. Therefore, as can be understood from FIGS. 12 to 14, in the cooling period (e.g., during midday in summer) as well, the amount of load processed during the precooling time is reduced by individually setting the presence-in-room start set temperature Ts and the air-conditioning target temperature Tm after the start of the presence in the room, and setting the air-conditioning target temperature Tm to a temperature lower than the presence-in-room start set temperature Ts. Because of this, with the air-conditioning apparatus A, a decrease in precooling time or a low-capacity operation can be achieved, and energy saving can be achieved by reducing the operation time accumulated in a day or increasing the device efficiency upon a low-capacity operation. FIGS. 12 and 14 illustrate an exemplary process of a low-capacity operation.

Furthermore, since the presence-in-room start set temperature Ts is close to the space temperature before the presence in the room, except for the case of generation of an excessive load, the temperature difference has little influence on the human body, thus improving the level of comfort. That is, with the air-conditioning apparatus A, in, for example, movement from outdoor air (32 degrees C.) to a living room (26 degrees C.), operation is performed so that the temperature in the living room is kept at 29 degrees C. (for deltaT2=2) until the start of the presence in the living room, and then a cooling operation is performed at a target temperature of 26 degrees C. after the start of the presence in the living room, thereby reducing the burden imposed on the human body while a satisfactory level of comfort is maintained.

(Cooling Period (e.g., in Evening of Summer))

Figure 15:
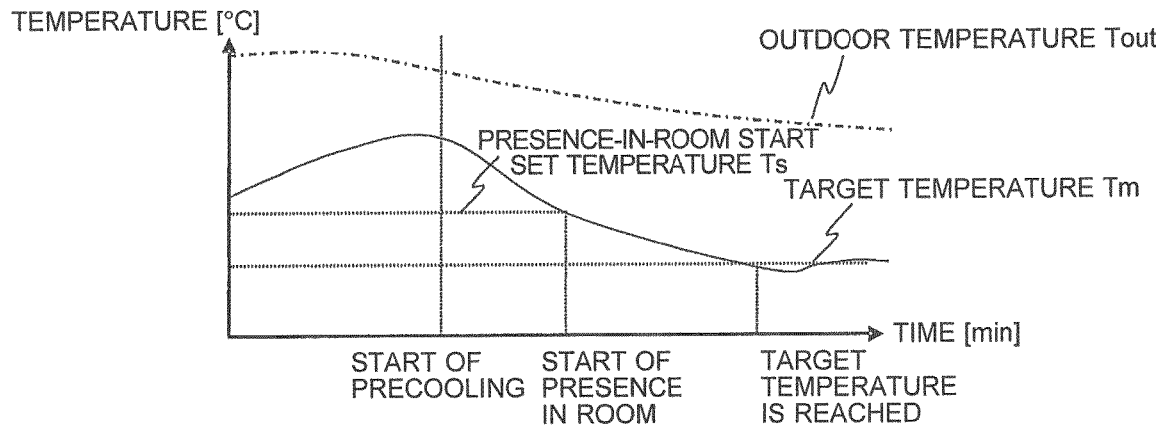
FIG. 15 is a temperature diagram showing a precooling control operation of the air-conditioning apparatus according to the embodiment of the present invention when the outdoor temperature is higher than the temperature after the start of the presence in the room at the start of precooling.

FIG. 15 is a temperature diagram showing a precooling control operation of the air-conditioning apparatus A when the outdoor temperature is higher than the temperature after the start of the presence in the room at the start of precooling. FIG. 16 is a temperature diagram showing a precooling control operation of the existing air-conditioning apparatus when the outdoor temperature is higher than the temperature after the start of the presence in the room at the start of precooling. FIG. 17 is a power consumption diagram showing a change in power consumption of each of the air-conditioning apparatus A and the existing air-conditioning apparatus during the precooling control operation when the outdoor temperature is higher than the temperature after the start of the presence in the room at the start of precooling. Referring to FIGS. 15 and 16, the abscissa indicates time, and the ordinate indicates temperature. Referring to FIG. 17, the abscissa indicates time, and the ordinate indicates power consumption.

Figure 16:
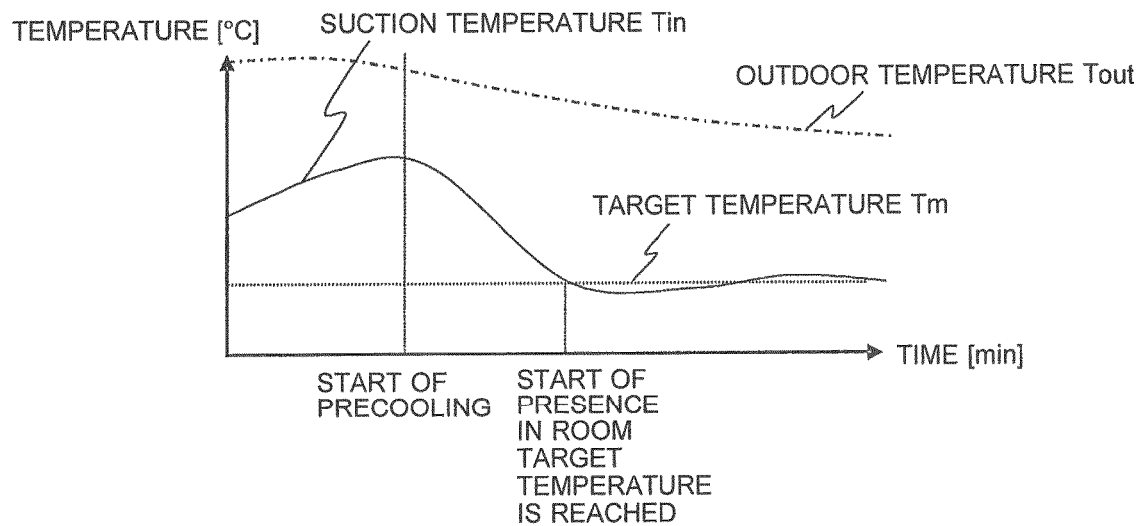
FIG. 16 is a temperature diagram showing a precooling control operation of the existing air-conditioning apparatus when the outdoor temperature is higher than the temperature after the start of the presence in the room at the start of precooling.
Figure 17:
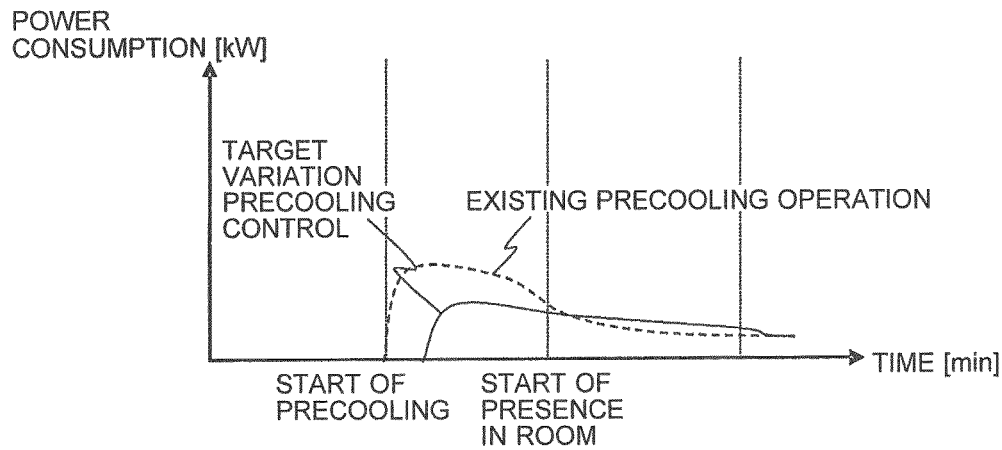
FIG. 17 is a power consumption diagram showing a change in power consumption of each of the air-conditioning apparatus according to the embodiment of the present invention and the existing air-conditioning apparatus during the precooling control operation when the outdoor temperature is higher than the temperature after the start of the presence in the room at the start of precooling.

As shown in FIGS. 15 to 17, in a cooling period (e.g., in the evening of summer), regardless of whether the room temperature-based target temperature control CONTROL_in or the outdoor air-based target temperature control CONTROL_out is done, the outdoor temperature is higher before the start of the presence in the room. Thus, if the amount of air blown by the air-sending means 12 of the heat source unit 10 is the same, before and after the start of the presence in the room, a higher refrigeration cycle efficiency can be attained upon a decrease in condensing temperature, and load processing can be performed more efficiently than before the start of the presence in the room by shortening the precooling time before the start of the presence in the room.

In addition, the amount of load processed during the precooling time is reduced by individually setting the presence-in-room start set temperature Ts and the air-conditioning target temperature Tm after the start of the presence in the room, and setting the air-conditioning target temperature Tm to a temperature lower than the presence-in-room start set temperature Ts. Thus, with the air-conditioning apparatus A, a decrease in precooling time or a low-capacity operation can be achieved, and energy saving can be achieved by reducing the operation time accumulated in a day or increasing the device efficiency upon a low-capacity operation. FIGS. 15 and 17 illustrate an exemplary process of a low-capacity operation.

Furthermore, since the presence-in-room start set temperature Ts is close to the space temperature before the presence in the room, except for the case of generation of an excessive load, the temperature difference has little influence on the human body, thus improving the level of comfort. That is, with the air-conditioning apparatus A, in, for example, movement from the outside of the room (30 degrees C.) to a living room (26 degrees C.), operation is performed so that the temperature in the living room is kept at 28 degrees C. (for deltaT2=2) until the start of the presence in the living room, and then a cooling operation is performed to decrease the temperature to 26 degrees C., thereby reducing the burden imposed on the human body due to factors associated with the temperature difference while a satisfactory level of comfort is maintained.

A specific action of a preheating control operation will be described first with reference to FIGS. 18 to 26.

A specific action of a preheating control operation when the outdoor temperature in a preheating start time zone is lower than the temperature after the start of the presence in the room (e.g., in the early morning of winter) in a heating period will be described with reference to FIGS. 18 to 20.

A specific action of a preheating control operation when the outdoor temperature in a preheating start time zone is almost equal to the temperature after the start of the presence in the room (e.g., during midday in winter) in a heating period will be described with reference to FIGS. 21 to 23.

A specific action of a preheating control operation when the outdoor temperature in a preheating start time zone is higher than the temperature after the start of the presence in the room (e.g., in the evening of winter) in a heating period will be described with reference to FIGS. 24 to 26.

(Heating Period (e.g., in Early Morning of Winter))

Figure 18:
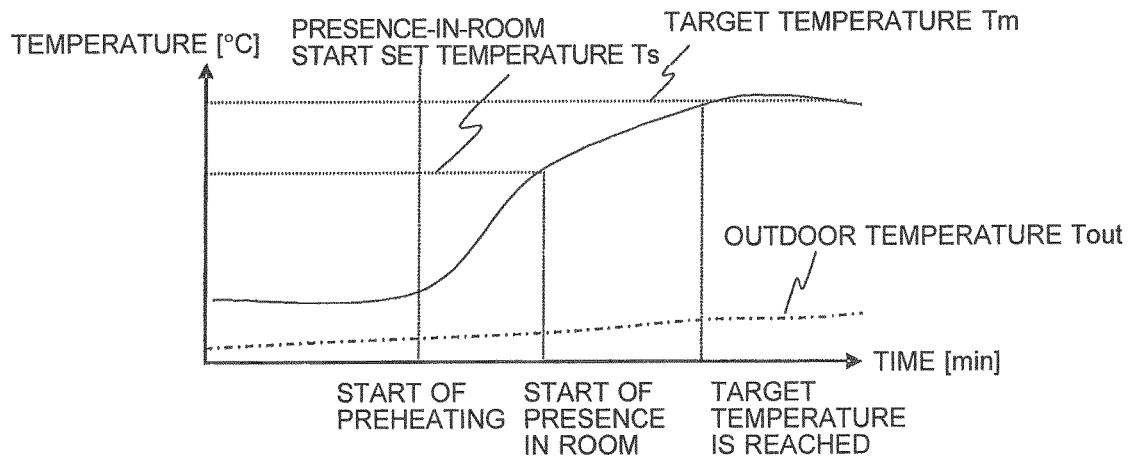
FIG. 18 is a temperature diagram showing a preheating control operation of the air-conditioning apparatus according to the embodiment of the present invention when the temperature is low at the start of preheating.

FIG. 18 is a temperature diagram showing a preheating control operation of the air-conditioning apparatus A when the temperature is low at the start of preheating. FIG. 19 is a temperature diagram showing a preheating control operation of the existing air-conditioning apparatus when the temperature is low at the start of preheating. FIG. 20 is a power consumption diagram showing a change in power consumption of each of the air-conditioning apparatus A and the existing air-conditioning apparatus during the preheating control operation when the temperature is low at the start of preheating. Referring to FIGS. 18 and 19, the abscissa indicates time, and the ordinate indicates temperature. Referring to FIG. 20, the abscissa indicates time, and the ordinate indicates power consumption.

Figure 19:
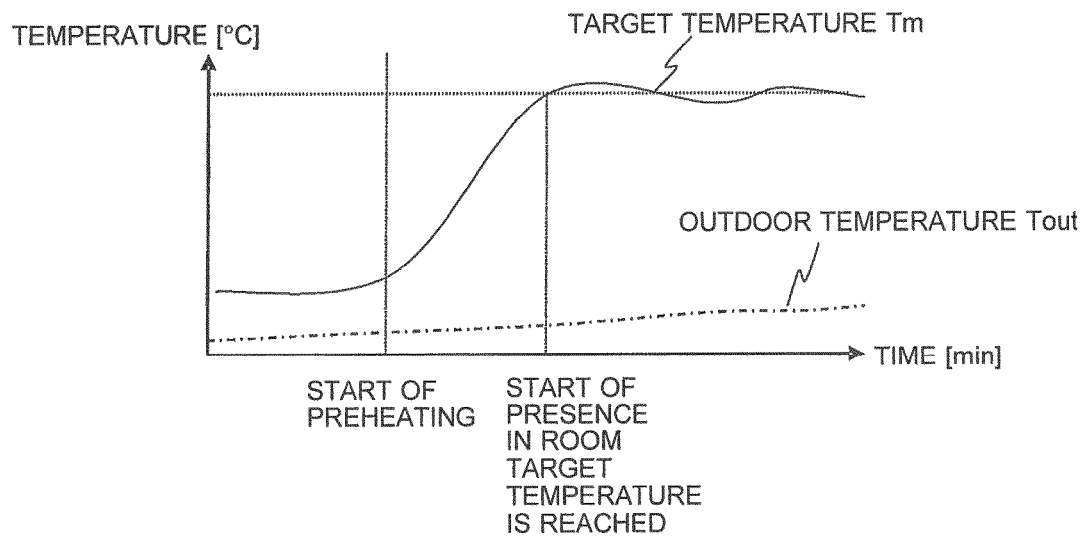
FIG. 19 is a temperature diagram showing a preheating control operation of the existing air-conditioning apparatus when the temperature is low at the start of preheating.
Figure 20:
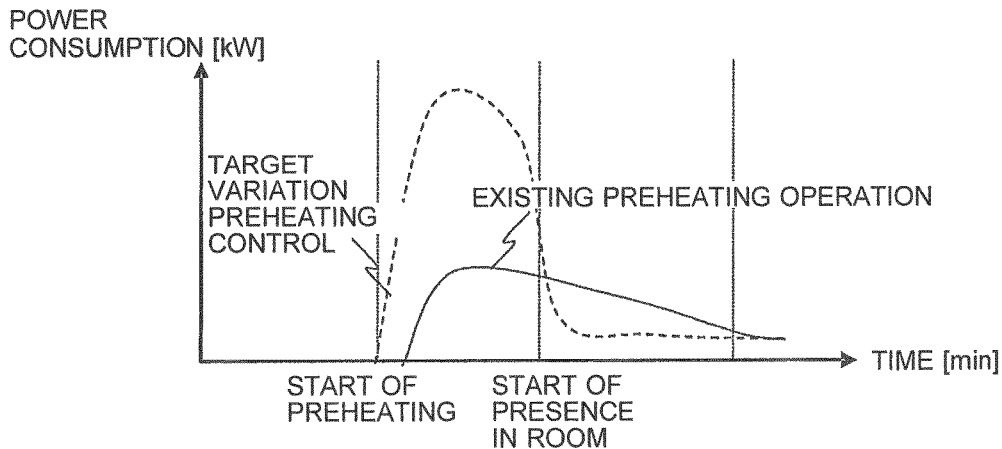
FIG. 20 is a power consumption diagram showing a change in power consumption of each of the air-conditioning apparatus according to the embodiment of the present invention and the existing air-conditioning apparatus during the preheating control operation when the temperature is low at the start of preheating.

As shown in FIGS. 18 to 20, in a heating period (e.g., in the early morning of winter), regardless of whether the room temperature-based target temperature control CONTROL_in or the outdoor air-based target temperature control CONTROL_out is done, the outdoor temperature is lower before the start of the presence in the room. Thus, if the amount of air blown by the air-sending means 12 of the heat source unit 10 is the same, before the start of the presence of the user in the room, a higher refrigeration cycle efficiency can be attained upon a decrease in evaporating temperature, and load processing can be performed more efficiently than at the start of the presence in the room by shortening the preheating time before the start of the presence in the room. In addition, at an evaporating temperature of about 0 degrees C., a difference in power consumption occurs depending on whether defrosting is required. Thus, the low outdoor air operation time is shortened, and the evaporating temperature is controlled to be equal to or higher than 0 degrees C., whereby the power saving effect is further enhanced.

Moreover, as shown in FIG. 18, the amount of load processed during the preheating time is reduced by individually setting the presence-in-room start set temperature Ts and the air-conditioning target temperature Tm after the start of the presence in the room, and setting the air-conditioning target temperature Tm to a temperature higher than the presence-in-room start set temperature Ts. Thus, a decrease in the preheating time or a low-capacity operation can be attained (see FIGS. 18 and 19), and energy saving can be achieved by reducing the operation time accumulated in a day or increasing the device efficiency upon a low-capacity operation (see FIG. 20). FIGS. 18 and 20 illustrate an exemplary process of a low-capacity operation.

Furthermore, since the presence-in-room start set temperature Ts is close to the space temperature before the presence in the room or equal to or higher than the minimum guaranteed temperature (e.g., 17 degrees C.), heat shock due to factors associated with the temperature difference is alleviated, thus improving the levels of comfort and safety. That is, with the air-conditioning apparatus A, in, for example, movement from a bedroom (room temperature: 15 degrees C.) to a living room (20 degrees C.), operation is performed so that the temperature in the living room is targeted at the minimum guaranteed temperature (e.g., 17 degrees C.) until the start of the presence in the living room, and then a heating operation is performed to increase the temperature to 20 degrees C., thereby simultaneously achieving both a reduction in burden imposed on the human body and an improvement in device efficiency while a satisfactory level of comfort is maintained.

(Heating Period (e.g., During Midday in Winter)

Figure 21:
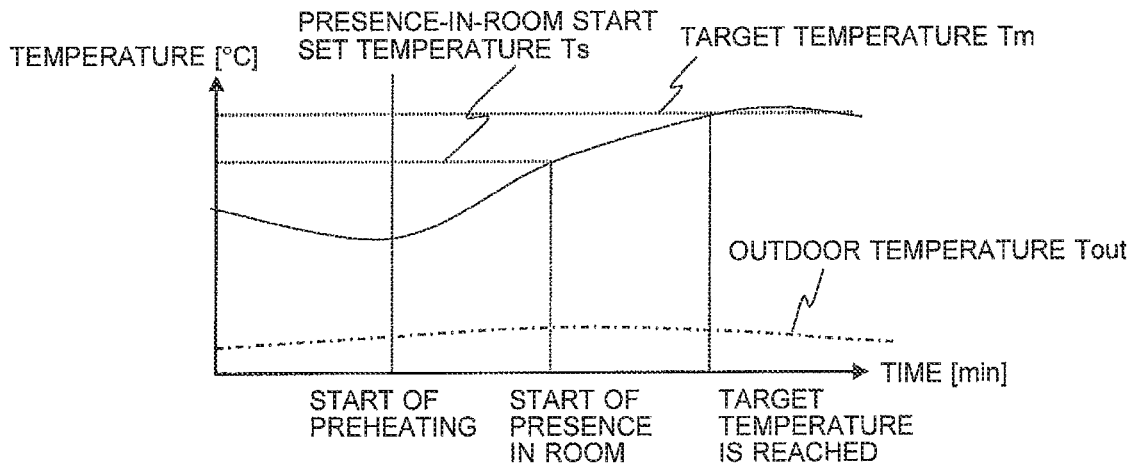
FIG. 21 is a temperature diagram showing a preheating control operation of the air-conditioning apparatus according to the embodiment of the present invention when the outdoor temperature and the temperature after the start of the presence in the room are almost equal to each other at the start of preheating.

FIG. 21 is a temperature diagram showing a preheating control operation of the air-conditioning apparatus A when the outdoor temperature and the temperature after the start of the presence in the room are almost equal to each other at the start of preheating. FIG. 22 is a temperature diagram showing a preheating control operation of the existing air-conditioning apparatus when the outdoor temperature and the temperature after the start of the presence in the room are almost equal to each other at the start of preheating. FIG. 23 is a power consumption diagram showing a change in power consumption of each of the air-conditioning apparatus A and the existing air-conditioning apparatus during the preheating control operation when the outdoor temperature and the temperature after the start of the presence in the room are almost equal to each other at the start of preheating. Referring to FIGS. 21 and 22, the abscissa indicates time, and the ordinate indicates temperature. Referring to FIG. 23, the abscissa indicates time, and the ordinate indicates power consumption.

Figure 22:
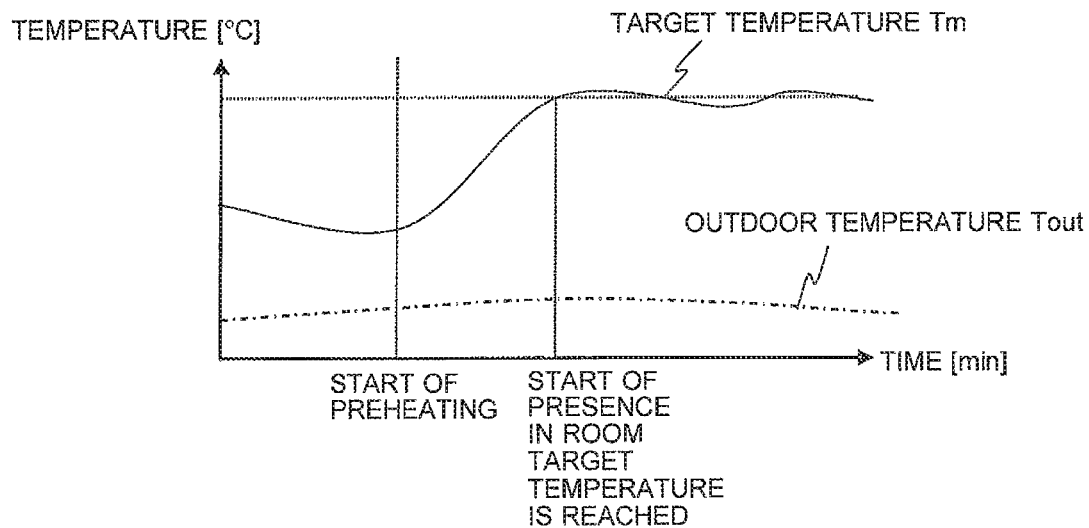
FIG. 22 is a temperature diagram showing a preheating control operation of the existing air-conditioning apparatus when the outdoor temperature and the temperature after the start of the presence in the room are almost equal to each other at the start of preheating.
Figure 23:
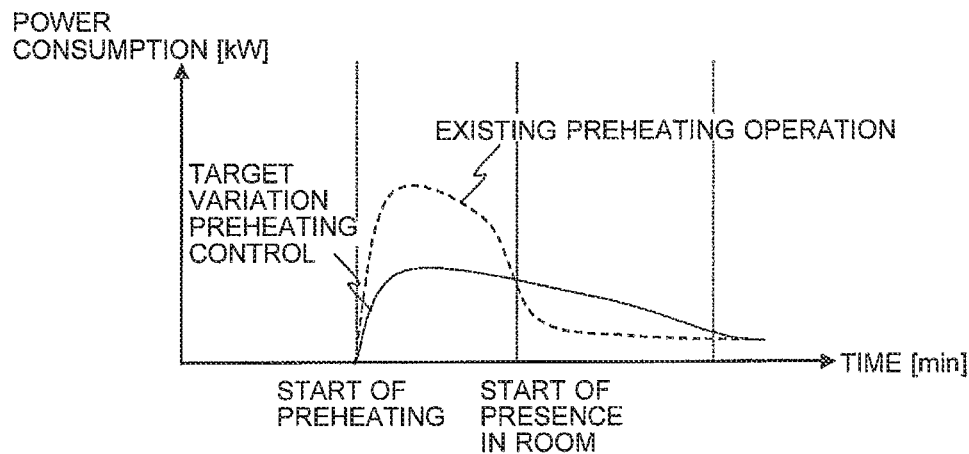
FIG. 23 is a power consumption diagram showing a change in power consumption of each of the air-conditioning apparatus according to the embodiment of the present invention and the existing air-conditioning apparatus during the preheating control operation when the outdoor temperature and the temperature after the start of the presence in the room are almost equal to each other at the start of preheating.

As shown in FIGS. 21 to 23, in a heating period (e.g., during midday in winter), the preheating operation time is not corrected on the basis of the outdoor temperature, but the amount of load processed during the preheating time is reduced by individually setting the presence-in-room start set temperature Ts and the air-conditioning target temperature Tm after the start of the presence in the room, and setting the air-conditioning target temperature Tm to a temperature higher than the presence-in-room start set temperature Ts. Thus, with the air-conditioning apparatus A, a decrease in the preheating time or a low-capacity operation can be attained, and energy saving can be achieved by reducing the operation time accumulated in a day or increasing the device efficiency upon a low-capacity operation. FIGS. 21 and 24 illustrate an exemplary process of a low-capacity operation.

Furthermore, since the presence-in-room start set temperature Ts is close to the space temperature before the presence in the room or equal to or higher than the minimum guaranteed temperature (e.g., 17 degrees C.), heat shock due to factors associated with the temperature difference is alleviated, thus improving the levels of comfort and safety. That is, with the air-conditioning apparatus A, in, for example, movement from outdoor air (room temperature: 10 degrees C.) to a living room (20 degrees C.), operation is performed so that the temperature in the living room is targeted at the minimum guaranteed temperature (e.g., 17 degrees C.) until the start of the presence in the living room, and then a heating operation is performed to increase the temperature to 20 degrees C., thereby simultaneously achieving both a reduction in burden imposed on the human body and an improvement in device efficiency while a satisfactory level of comfort is maintained.

(Heating Period (e.g., in Evening of Winter)

Figure 24:
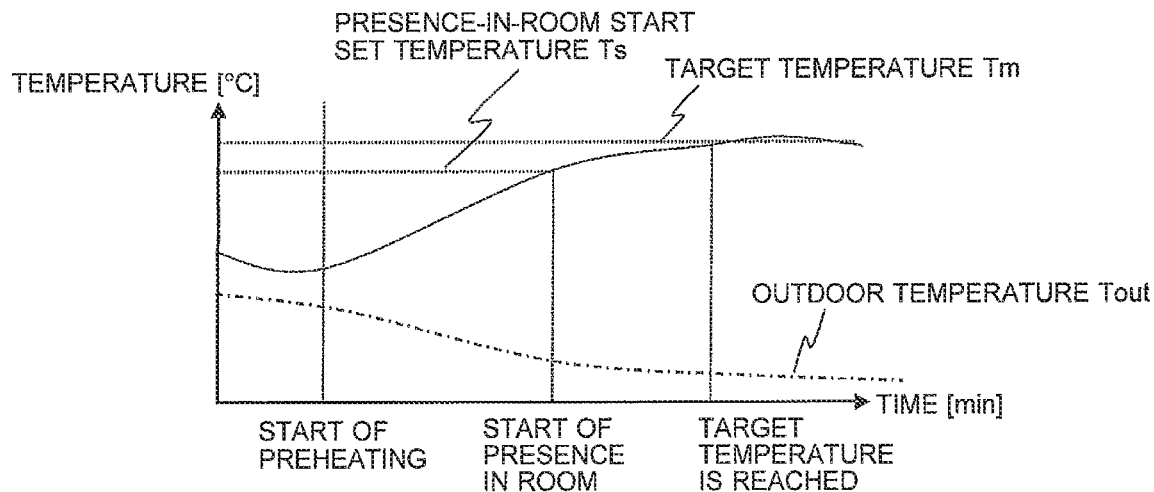
FIG. 24 is a temperature diagram showing a preheating control operation of the air-conditioning apparatus according to the embodiment of the present invention when the outdoor temperature is higher than the temperature after the start of the presence in the room at the start of preheating.

FIG. 24 is a temperature diagram showing a preheating control operation of the air-conditioning apparatus A when the outdoor temperature is higher than the temperature after the start of the presence in the room at the start of preheating. FIG. 25 is a temperature diagram showing a preheating control operation of the existing air-conditioning apparatus when the outdoor temperature is higher than the temperature after the start of the presence in the room at the start of preheating. FIG. 26 is a power consumption diagram showing a change in power consumption of each of the air-conditioning apparatus A and the existing air-conditioning apparatus during the preheating control operation when the outdoor temperature is higher than the temperature after the start of the presence in the room at the start of preheating. Referring to FIGS. 24 and 25, the abscissa indicates time, and the ordinate indicates temperature. Referring to FIG. 26, the abscissa indicates time, and the ordinate indicates power consumption.

Figure 25:
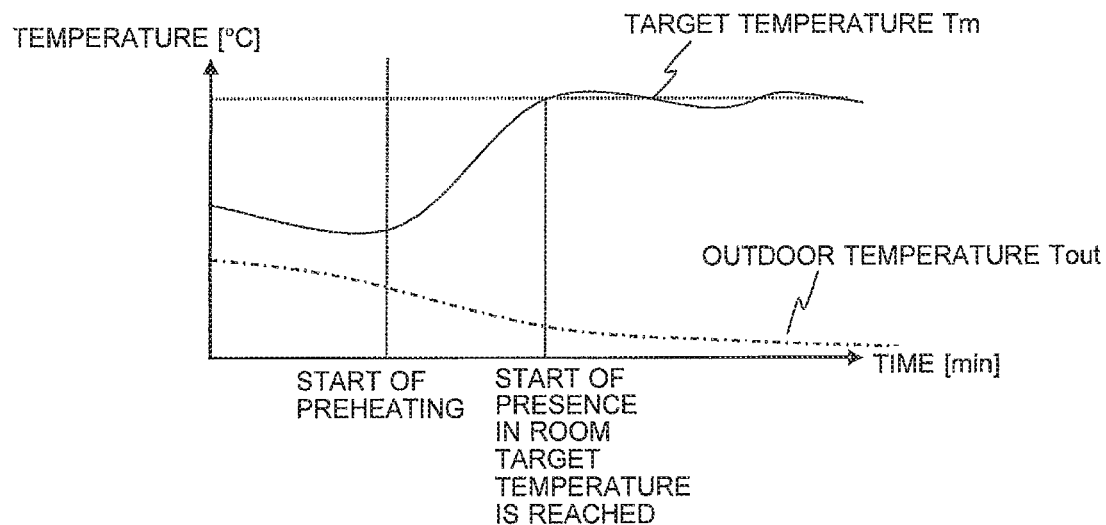
FIG. 25 is a temperature diagram showing a preheating control operation of the existing air-conditioning apparatus when the outdoor temperature is higher than the temperature after the start of the presence in the room at the start of preheating.
Figure 26:
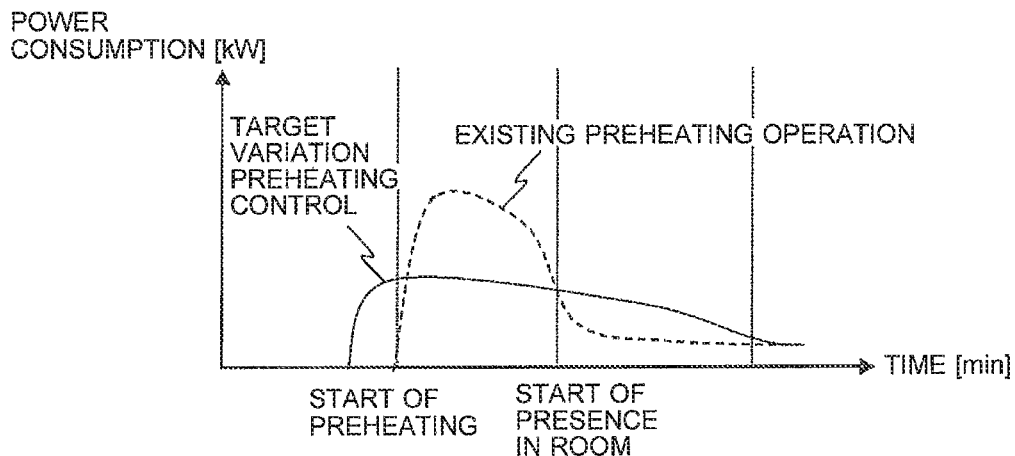
FIG. 26 is a power consumption diagram showing a change in power consumption of each of the air-conditioning apparatus according to the embodiment of the present invention and the existing air-conditioning apparatus during the preheating control operation when the outdoor temperature is higher than the temperature after the start of the presence in the room at the start of preheating.

As shown in FIGS. 24 to 26, in a heating period (e.g., in the evening of winter), regardless of whether the room temperature-based target temperature control CONTROL_in or the outdoor air-based target temperature control CONTROL_out is done, the outdoor temperature is higher before the start of the presence in the room. Thus, if the amount of air blown by the air-sending means 12 of the heat source unit 10 is the same, before and after the start of the presence in the room, a higher refrigeration cycle efficiency can be attained upon an increase in evaporating temperature, and load processing can be performed more efficiently than before the start of the presence in the room by prolonging the preheating time before the start of the presence in the room.

In addition, the amount of load processed during the preheating time is reduced by individually setting the presence-in-room start set temperature Ts and the air-conditioning target temperature Tm after the start of the presence in the room, and setting the air-conditioning target temperature Tm to a temperature higher than the presence-in-room start set temperature Ts. Thus, with the air-conditioning apparatus A, a decrease in the preheating time or a low-capacity operation can be attained, and energy saving can be achieved by reducing the operation time accumulated in a day or increasing the device efficiency upon a low-capacity operation. FIGS. 24 and 26 illustrate an exemplary process of a low-capacity operation.

Furthermore, since the presence-in-room start set temperature Ts is close to the space temperature before the presence in the room or equal to or higher than the minimum guaranteed temperature (e.g., 17 degrees C.), heat shock due to factors associated with the temperature difference is alleviated, thus improving the levels of comfort and safety. That is, with the air-conditioning apparatus A, in, for example, movement from outdoor air (room temperature: 12 degrees C.) to a living room (20 degrees C.), operation is performed so that the temperature in the living room is targeted at the minimum guaranteed temperature (e.g., 17 degrees C.) until the start of the presence in the living room, and then a heating operation is performed to increase the temperature to 20 degrees C., thereby simultaneously achieving both a reduction in burden imposed on the human body and an improvement in device efficiency while a satisfactory level of comfort is maintained.

«Advantageous Effects Obtained by Air-Conditioning Apparatus A»

As shown in FIGS. 9 to 26, with the air-conditioning apparatus A obtained as described above, by setting the presence-in-room start set temperature Ts in accordance with a variation in outdoor temperature or the activity conditions of the user, it is possible to adjust the precooling and preheating times, and thus it is possible to simultaneously reduce a burden on the human body and achieve energy saving by precooling or preheating with comfort.

In addition, with the air-conditioning apparatus A, by adjusting the presence-in-room start set temperature Ts, energy saving and comfort improvement can be achieved even when omission of either precooling or preheating operation is typically desirable for energy saving (e.g., when the framework insulation performance is low and the loss of heat transfer is high during preheating due to the requirement of a high load in winter).

In the related art, in the case where an indoor load is not fully eliminated by the time of start of the presence in the room, a high-capacity operation is performed at the start of the presence in the room. However, with the air-conditioning apparatus A, even after the start of the presence in the room, it is possible to continue a low-capacity operation. Thus, even if an unexpected situation where a window is opened occurs during a precooling or preheating operation, it is possible to reduce the amount of power consumption wasted.

By these precooling and preheating control operations, a processing load on the air-conditioning apparatus A is leveled, and thus peak cut of power consumption is possible. Therefore, even when an instruction (demand) to reduce an amount of power consumption occurs from the power supply side, air-conditioning can be performed while a satisfactory level of comfort is maintained.

Reference Signs List 1a discharge temperature sensor 1b suction temperature sensor 1c temperature sensor 1d temperature sensor 1e temperature sensor 1f temperature sensor 1g temperature sensor 1h temperature sensor 2 load detection means 2a load detection means 2b load detection means 2c load detection means 10 heat source unit 11 heat exchanger 12 air sending means 13 compressor 14 expansions means 15 four-way valve 16 control board 20 indoor unit 20a indoor unit 20b indoor unit 21 heat exchanger 22 air-sending means 23 control board 30 controller 30a controller 30b controller 40 external information obtaining means 51 presence-in-room start temperature control unit 52 target temperature setting unit 53 compressor driving unit 54 presence-in-room start temperature change unit 55 presence-in-room start temperature setting unit 56 operation time change unit 57 presence-in-room duration obtaining unit 100 pipe 101 communication line 1000 refrigeration cycle A air-conditioning apparatus

The invention claimed is:

1. An air-conditioning apparatus that executes a precooling operation or a preheating operation in at least one of first and second air-conditioned spaces, the air-conditioning apparatus comprising:

first and second pre-presence-in-room information obtaining devices, wherein each pre-presence-in-room information obtaining device is configured to obtain presence-in-room information set by a user, wherein the first pre-presence-in-room information obtaining device is installed in the first air-conditioned space, and the second pre-presence-in-room information obtaining device is installed in the second air-conditioned space; and a plurality of controllers, wherein a first one of the controllers is installed in the first air-conditioned space, and a second one of the controllers is installed in the second air-conditioned space, the first one and the second one of the controllers can communicate with one another, the first one and the second one of the controllers are configured to execute the precooling operation or the preheating operation in the first and the second air-conditioned spaces on the basis of a result obtained by the first and the second pre-presence-in-room information obtaining devices, respectively, the first one of the controllers sets a presence-in-room start set temperature, which serves as a target temperature at a presence-in-room start scheduled time of the user, in the first air-conditioned space, the second pre-presence-in-room information obtaining device includes a temperature sensor configured to detect a temperature in the second air-conditioned space, in a case in which the first one of the controllers determines, based on information from the second pre-presence-in-room information obtaining device, that a user is present in the second air-conditioned space before the start of the user's presence in the first air conditioned space, in the precooling operation and the preheating operation of the first air-conditioned space, the first one of the controllers sets a temperature that is detected by the temperature sensor when the user is present in the second air-conditioned space as the presence-in-room start set temperature of the first air-conditioned space, and in a case in which the first one of the controllers determines, based on information from the second pre-presence-in-room information obtaining device, that the user is outdoors before the start of the user's presence in the first air conditioned space, in the precooling operation and the preheating operation of the first air-conditioned space, the first one of the controllers sets a temperature that is computed based on an outdoor temperature as the presence-in-room start set temperature of the first air-conditioned space.

2. The air-conditioning apparatus of claim 1, wherein when the presence-in-room start set temperature and a target set temperature, which is set by the user, are different from each other, the first one of the controllers is configured to set the presence-in-room start set temperature of the first air-conditioned space to a temperature higher than the target set temperature after the start of the presence of the user in the first air-conditioned space in the precooling operation, and set the presence-in-room start set temperature of the first air-conditioned space to a temperature lower than the target set temperature after the start of the presence of the user in the first air-conditioned space in the preheating operation.

3. The air-conditioning apparatus of claim 1, further comprising a compressor configured to compress and discharge a refrigerant, wherein each of the first one and the second one of the controllers is configured to drive the compressor with an operation capacity equal to an operation capacity thereof in the precooling operation or the preheating operation, until a temperature of the corresponding one of the first and second air-conditioned spaces reaches a target set temperature after start of the presence of the user in the corresponding one of the first and second air-conditioned spaces.

4. The air-conditioning apparatus of claim 3, wherein each of the first one and the second one of the controllers is configured to operate the compressor with an operation capacity kept constant at substantially 50% of a maximum operation capacity.

5. The air-conditioning apparatus of claim 1, wherein
in a case in which the first one of the controllers determines, based on information from the second pre-presence-in-room information obtaining device, that the user is outdoors before the start off the user's presence in the first air-conditioned space, when the precooling operation starts, the first one of the controllers is configured to
compare an outdoor temperature detected by a temperature sensor before the presence in the first air-conditioned space with a preset upper limit temperature, and
set a value obtained by subtracting a predetermined temperature width from the presence-in-room start set temperature of the first air-conditioned space as a new presence-in-room start set temperature of the first air-conditioned space if the outdoor temperature is lower than the upper limit temperature, and
set the upper limit temperature as the new presence-in-room start set temperature of the first air-conditioned space if the outdoor temperature is not lower than the upper limit temperature.

6. The air-conditioning apparatus of claim 5, wherein the first one of the controllers is further configured to
obtain outdoor temperature variation prediction information from an external information obtaining device;
if an initial temperature in a predetermined section of the outdoor temperature variation prediction information is higher than a final temperature, and an absolute value of a difference between the initial temperature and the final temperature is not smaller than a predetermined determination threshold, shorten an operation time of the precooling operation of the first air-conditioned space; and
if the initial temperature in the predetermined section of the outdoor temperature variation prediction information is lower than the final temperature, and the absolute value of the difference between the initial temperature and the final temperature is not smaller than a predetermined determination threshold, prolong the operation time of the precooling operation of the first air-conditioned space.

7. The air-conditioning apparatus of claim 1, wherein each of the first one and the second one of the controllers is further configured to collect use information of at least one device present in the corresponding one of the first and second air-conditioned spaces and obtain a presence-in-room duration of the user on the basis of the collected information.

8. The air-conditioning apparatus of claim 7, wherein the at least one device includes at least one of an air-conditioning apparatus, an illumination device, a human sensor, and an interior door present in the corresponding one of the first and second air-conditioned spaces.

9. The air-conditioning apparatus of claim 1, wherein each of the first one and the second one of the controllers further changes a start time of the precooling operation or the preheating operation of the corresponding one of the first and second air-conditioned spaces based on a detection result obtained by the corresponding one of the first and the second pre-presence-in-room information obtaining device.

10. The air-conditioning apparatus of claim 1, wherein before the presence of the user in one of the first and the second air-conditioned spaces, a location of the user includes an indoor environment and an outdoor environment.

11. The air-conditioning apparatus of claim 1, wherein each of the first one and the second one of the controllers determines a time of the precooling operation or the preheating operation on the basis of the outdoor temperature.

12. An air-conditioning control method for an air-conditioning apparatus which executes a precooling operation or a preheating operation in at least one of first and second air-conditioned spaces, the method comprising:
setting a presence-in-room start set temperature for the first air-conditioned space, which serves as a target temperature at a presence-in-room start scheduled time of a user;
in a case in which a controller determines, based on information from a pre-presence-in-room information obtaining device, which includes a temperature sensor and is installed in the second air-conditioned space, that a user is present in the second air-conditioned space before the start of the user's presence in the first air-conditioned space, in the precooling operation and the preheating operation, setting a temperature that is detected by the temperature sensor when the user is present in the second air-conditioned space as the presence-in-room start set temperature of the first air-conditioned space; and
in a case in which the controller determines, based on information from the pre-presence-in-room information obtaining device, that the user is outdoors before the start of the user's presence in the first air conditioned space, in the precooling operation and the preheating operation of the first air-conditioned space, setting a temperature that is computed based on an outdoor temperature as the presence-in-room start set temperature of the first air-conditioned space.

* * * * *